(12) United States Patent
Rambow et al.

(10) Patent No.: US 7,245,791 B2
(45) Date of Patent: Jul. 17, 2007

(54) COMPACTION MONITORING SYSTEM

(75) Inventors: Frederick Henry Kreisler Rambow, Houston, TX (US); Dennis Edward Dria, Houston, TX (US); Michelle Yvonne Shuck, Houston, TX (US)

(73) Assignee: Shell Oil Company, Houston, TX (US)

( * ) Notice: Subject to any disclaimer, the term of this patent is extended or adjusted under 35 U.S.C. 154(b) by 90 days.

(21) Appl. No.: 11/107,270

(22) Filed: Apr. 15, 2005

(65) Prior Publication Data

US 2006/0233482 A1    Oct. 19, 2006

(51) Int. Cl.
*G02B 6/00* (2006.01)
*G02B 6/34* (2006.01)

(52) U.S. Cl. .............................. 385/12; 385/13; 385/37
(58) Field of Classification Search .................. 385/12
See application file for complete search history.

(56) References Cited

U.S. PATENT DOCUMENTS

| | | | |
|---|---|---|---|
| 4,654,520 A | 3/1987 | Griffiths | 250/227 |
| 5,321,257 A | 6/1994 | Danisch | 250/227.16 |
| 5,400,422 A | 3/1995 | Askins et al. | 385/37 |
| 5,419,636 A | 5/1995 | Weiss | 374/161 |
| 5,661,246 A | 8/1997 | Wanser et al. | 73/800 |
| 5,705,812 A | 1/1998 | Brewer et al. | 250/264 |
| 5,753,813 A | 5/1998 | Hagiwara | 73/152.54 |
| 5,798,521 A | 8/1998 | Froggatt | 250/227.19 |
| 5,818,982 A | 10/1998 | Voss et al. | 385/13 |
| 6,233,374 B1 * | 5/2001 | Ogle et al. | 385/13 |
| 6,252,656 B1 | 6/2001 | Wu et al. | 356/73.1 |
| 6,256,090 B1 | 7/2001 | Chen et al. | 356/73.1 |
| 6,346,702 B1 | 2/2002 | Davis et al. | 250/227.14 |
| 6,354,147 B1 | 3/2002 | Gysling et al. | 73/61.79 |
| 6,363,089 B1 | 3/2002 | Fernald et al. | 372/20 |
| 6,426,496 B1 | 7/2002 | Froggatt et al. | 250/227.18 |
| 6,450,037 B1 | 9/2002 | McGuinn et al. | 73/705 |
| 6,545,760 B1 | 4/2003 | Froggatt et al. | 356/477 |
| 6,566,648 B1 | 5/2003 | Froggatt | 250/227.14 |
| 6,612,992 B1 * | 9/2003 | Hossack et al. | 600/467 |
| 6,854,327 B2 | 2/2005 | Rambow et al. | 73/250 |
| 6,856,400 B1 | 2/2005 | Froggatt | 356/477 |
| 2005/0285059 A1 * | 12/2005 | Gerber et al. | 250/559.45 |
| 2006/0045408 A1 | 3/2006 | Jones et al. | 385/12 |

FOREIGN PATENT DOCUMENTS

| | | |
|---|---|---|
| DE | 19913113 | 10/2000 |
| DE | 19913113 C2 | 12/2000 |
| EP | 0892244 B1 | 9/2003 |
| EP | 1672344 | 6/2006 |
| GB | 1570511 | 2/1980 |
| WO | WO2006113327 A1 | 10/2006 |

OTHER PUBLICATIONS

David S. Czaplak, et al., "Microbend Fiber-Optic Phase Shifter", Journal of Lightwave Technology, vol. LT-4, No. 1, Jan. 1986. pp. 50-54.

(Continued)

*Primary Examiner*—Tina M Wong

(57) ABSTRACT

Methods for determining a preferred application of a plurality of transducers or sensors to a structure are disclosed for monitoring and imaging deformation of the structure as it is subjected to various forces.

104 Claims, 17 Drawing Sheets

OTHER PUBLICATIONS

Betty L. Anderson, et al., " New Approach to Microbending Fiber Optic Sensors: Varying the Spatial Frequency", Optical engineering, Jan. 1995, vol. 34, No. 1., pp. 208-213.

D. S. Starodubov, et al., "Ultrastrong Fiber Gratings and Their Applications", SPIE vol. 3848, pp. 178-185.

Weichong Du, et al., "Long-Period Fiber Grating Bending Sensors In Laminated Composite Structures", SPIE vol. 3330, pp. 284-292.

Seungin Baek, et al., "Characteristics of Short-Period Blazed Fiber Bragg Gratings for use as Macro-Bending Sensors", Applied Optics, vol. 41, No. 4, Feb. 2002, pp. 631-636.

* cited by examiner

COMPACTION MONITORING SYSTEM

FIELD OF INVENTION

The present invention generally relates to methods for determining a preferred application of a plurality of transducers or sensors to a cylindrical structure for monitoring deformation of the structure as the structure is subjected to various forces. The present invention is also directed to methods for imaging deformation of an object as the object is subjected to various forces.

BACKROUND OF THE INVENTION

Wells in compactable sediments (or tectonically active areas) are subject to deformation over the productive life of the field. The result is the catastrophic loss of producing zones up to and including the loss of a whole well. The problem is exacerbated by the increasingly rapid off-take rates and the completion of multiple zones in a single well. The observable phenomenon is that at first a well casing will bend or begin to buckle, frequently at casing joints, or interfaces in the formation. As the compaction continues, the movement results in a significant misalignment of the well axis. The result can be the complete loss of the well investment resulting in deferred and/or lost production, if not the replacement cost of a well, which is extremely expensive. The ability to detect early bending would warn of a later buckle or collapse and allow for changes in production practices and/or remedial action. Detection of deformation forces, in-situ, can become a complex problem, particularly when such forces include axial, hoop and shear stresses.

The art is filled with hybrid combinations of radioactive tagging and casing monitoring technologies. For example, conventional compaction monitoring methods include radioactive tags that are applied to the casing and/or radioactive bullets that are shot into the formation as described in U.S. Pat. Nos. 5,753,813 and 5,705,812. These methods require logging tools that are run in the well periodically to monitor relative movement. Because the well is shut in, there is a risk that the tool might not come back out.

As described U.S. Pat. Nos. 6,450,037; 6,363,089; 6,354,147; 6,346,702; and 6,252,656, optical fiber has been used to measure temperature, pressure, flow, and acoustics. Optical fiber has also been conventionally used to measure strain, which is a more subtle measurement of strain than compaction. The amount of strain that conventional optical fiber can withstand before breaking is usually on the order of one to two percent of its length, which is less than the strain encountered in most wells that undergo compaction. In such environments, tubular structures and casing may undergo displacements or deformations that are locally much greater than ten percent. Such deformations could easily break fibers or elements that are constrained to the tubular structure or casing and caused to strain therewith.

Although several papers have reported on field use of a variety of fiber optic sensors, most have not found wide use in practice, other than for alarm mode or tactile sensing, due to problems associated with erratic response, tolerances of the deformers, mechanical fatiguing of the fiber, and a limited quantitative understanding of the mode problems and radiation loss associated with the use of multimode fiber. Such papers relate to microbending optical fiber rather than to macrobending and include: 1) Czaplak, D., Rashleigh, S., Taylor, H. and Weller, J., Sachs Freeman Associates, "Microbend fiber-optic phase shifter," January 1986, Vol. 4, Issue: 1, pp. 50-54, *Journal of Lightwave Technology*, Landover, Md., USA; and 2) B. L. Anderson and J. A. Brosig, "New Approach to Microbending Fiber Optic Sensors: Varying the Spatial Frequency," 1995, *Optical Engineering*, 34(1), pp. 208-213. Other similar patent references exist such as U.S. Pat. No. 5,419,636. The significant advantage of macrobending over microbending relates to the predictability and reproducibility of the data results for the deformation. These features are particularly significant in sensors used for making precise measurements over a wide dynamic range of strain.

Several patents disclose the use of a bent optical fiber sensor in a variety of applications. For example, U.S. Pat. No. 5,321,257 describes a bent optical fiber sensor comprising a fiber optic guide having a light emission surface extending in a thin band on a side of the fiber for a portion of its length. The light emission surface is covered by a coating of light absorbent material. The primary applications are in the fields of sports medicine and biometrics.

In another example, U.S. Pat. No. 5,661,246 describes an assembly that allows use of fiber optic displacement sensors in a high-temperature environment comprising a rod attached to an underlying surface at one point and guided to move in a selected direction of measurement, wherein the distance between a selected movable location on the rod and a point fixed on the surface is measured using a bent optical fiber having light loss characteristics dependent on that distance.

In yet another example, U.S. Pat. No. 5,818,982 describes fiber optic sensors wherein the shape of a length of fiber is changed under carefully controlled boundary conditions, providing a reproducible macrobending-induced loss, which can be implemented in a variety of highly precise and a wide range of sensor applications.

The foregoing optical fiber examples that utilize a bent optical fiber, however, lack a signal-to-noise ratio and dynamic range measurement that is acceptable for monitoring compaction-induced strain on a tubular structure such as casing. In other words, light lost at each bend adds up quickly and results in a signal that is too low to practically measure.

Optical fiber that is treated with Fiber Bragg Gratings is, however, more practical for use in monitoring compaction-induced strain on the tubular structure. Fiber Bragg Gratings are made by laterally exposing the core of a single-mode fiber to a periodic pattern of intense UV light. This creates areas of increased refractive index within the fiber. The fixed index modulation is referred to as a Fiber Bragg Grating (hereinafter "FBG"). All reflected light signals combine coherently to one large reflection at one wavelength when the grating period is equal to half the input wavelength. Other wavelengths of light are, for all intents and purposes, transparent. Light therefore, moves through the grating with negligible attenuation or signal variation with only the Bragg wavelength being affected, i.e., strongly backreflected at each FBG sensor. In other words, the center frequency of the grating is directly related to the grating period, which is affected by thermal or mechanical changes in the environment. Thus, temperature, strain and other engineering parameters may be calculated by measuring the normalized change in reflected wavelength. Being able to preset and maintain the grating wavelength is, thus, what makes FBG sensors so useful. See "Fiber Bragg Grating" 3M US Online, 27 Nov. 2000.

Conventional FBG systems applied axially or radially to a structure may not, however, be suitable for monitoring compaction induced strain on the structure because fibers or elements that are constrained to the structure and stretched or compressed may break under strain greater than about one to two percent.

Nevertheless, U.S. Pat. No. 6,854,327, incorporated herein by reference, describes the use of bent, instead of stretched, FBG sensors that alter amplitude reflection and broaden frequency. The FBG sensors react to displacement forces with a predictable, altered, wavelength response that may be compared with a calibration curve to estimate shape and the magnitude of displacement One embodiment is described as a helical-shaped optical fiber, wherein the FBG sensors are positioned in the bends of the optical fiber. The helical application of the FBG sensors around the structure reduces the strain transferred from the structure to the FBG sensors attached thereto. This embodiment therefore, teaches that a helical wrap angle may permit the application of FBG sensors to a structure likely to encounter considerably greater strain than the FBG sensors may sustain. Various other embodiments are generally described for applying the bent FBG sensors (transducers) to a tubular structure, such as casing.

Conventional FBG systems have also been proposed wherein the FBG sensors are i) specially treated (short-term blazed) as described in "Characteristics of short-period blazed FBG sensors for use as macro-bending sensors", APPLIED OPTICS, 41, 631-636 (2002), Baek, S., et al.; ii) bent as described in "Long-Period Fiber Grating Bending Sensors in Laminated Composite Structures", SPIE Conference on Sensory Phenomena and Measurement Instrumentation for Smart Structures and Materials, March 1998,San Diego, Calif., SPIE Vol. 3330, 284-292, Du, W., et al.; and iii) coated as described in "Ultrastrong Fiber Gratings and Their Applications", SPIE Conference Phototonics East "Optical Fiber Reliability and Testing", 3848-26, Sep. 20, 1999, Starodubov, D. S., et al. Other conventional systems using FBG sensors are described in U.S. Pat. Nos. 5,798, 521, 6,426,496, 6,566,648 and 6,856,400.

A preferred application of an FBG system, based on a preferred wrap angle, however, has not been proposed. Based on the wrap angle, the application of a FBG system or other conventional sensors to a tubular structure may be uniquely tailored to detect and measure various types and levels of strain the tubular structure is likely to encounter in a particular environment. Thus, strain on the tubular structure may be more accurately detected, in-situ, and measured in real time. As a result, deformation of the tubular structure may be anticipated, if not avoided.

A need therefore, inherently exists for determining a preferred application of transducers to a tubular structure for detecting and measuring large deformations of the structure. A need also exists for imaging deformation of an object, based on a preferred application of the transducers to the object, in order to image the shape and magnitude of the deformation.

SUMMARY OF THE INVENTION

The present invention meets the above needs and overcomes one or more deficiencies in the prior art by providing methods for imaging deformation of an object as the object is subjected to various forces, and methods for determining a preferred application of a plurality of transducers or sensors to a cylindrical structure for monitoring deformation of the structure as the structure is subjected to various forces.

In one embodiment, the present invention provides a method for imaging deformation of an object by: 1) applying a plurality of transducers to the object at a preferred wrap angle; 2) detecting deformation of the object at each transducer; 3) transmitting the deformation detected at each transducer to a projection device; and 4) imaging the deformation detected at each transducer on the projection device.

In another embodiment, the present invention provides a method of determining a preferred application of a plurality of transducers to a cylindrical structure for monitoring deformation of the structure by: 1) selecting a preferred wrap angle; 2) determining a strain factor for at least one wrap angle within the preferred wrap angle range; 3) determining a preferred wrap angle within the preferred wrap angle range based upon at least one determined strain factor; and 4) determining the preferred application of the plurality of transducers to the structure based on the preferred wrap angle.

In yet another embodiment, the present invention provides a method of determining a preferred application of an optical fiber to a cylindrical structure, wherein the optical fiber includes at least one sensor, by: 1) selecting a preferred wrap angle range for the optical fiber; 2) determining a fiber strain factor for at least one wrap angle within the preferred wrap angle range; 3) determining a preferred wrap angle for the optical fiber within the preferred wrap angle range based on at least determined fiber strain factor; and 4) determining the preferred application of the optical fiber to the structure based on the preferred wrap angle.

Other objects, features and advantages of the present invention will be apparent to those skilled in the art from the following description of the various embodiments and related drawings.

BRIEF DESCRIPTION OF THE DRAWINGS

The present invention is described in detail below with reference to the attached drawing figures, wherein.

DETAILED DESCRIPTION OF THE PREFERRED EMBODIMENTS

The subject matter of the present invention is described with specificity however, the description itself is not intended to limit the scope of the invention. The claimed subject matter thus, might also be embodied in other ways to include different steps or combinations of steps similar to the ones described herein, in conjunction with other present or future technologies. Moreover, although the term "step" may be used herein to connote different methods employed, the term should not be interpreted as implying any particular order among or between various steps herein disclosed except when the order of individual steps is explicitly described.

The following description refers to the use of a plurality of transducers that may comprise one or more conventional FBG sensors such as, for example, the transducers described in U.S. Pat. Nos. 5,798,521, 6,426,496, or 6,854,327. The present invention, however, is not limited to the use of FBG type sensors and may be implemented with conventional sensors or transducers capable of detecting axial and/or radial strain such as, for example, strain gauges as described in "Strain Gauge Technology," A. L. Window (Editor), Elsevier Science Pub. Co., $2^{nd}$ edition, November 1992. Thus, the novel techniques and methods described herein may be implemented and applied through the use of any type of sensor or transducer capable of detecting signals and transmitting signals, regardless of whether it is a FBG sensor, strain gauge or other conventional type sensor or transducer. Furthermore, the use of an optical fiber as a transmission means to illustrate various applications of the invention described herein is not exclusive of other well-known transmission means that may be used to connect the transducers such as, for example, electrical wires, which are capable of transmitting power and a signal. Furthermore, conventional wireless transducers may be used provided that they include a power source.

Figure 1:
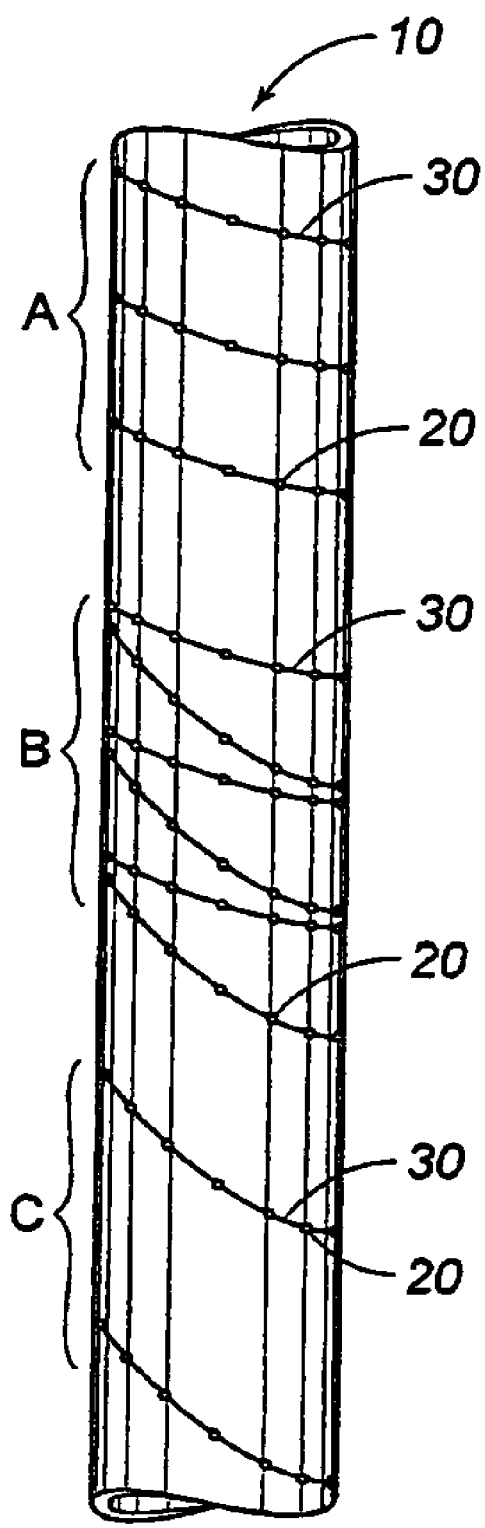
FIG. 1 is an elevational view of a cylindrical structure illustrating a plurality of sensors or transducers applied to the structure along three different sections (A, B, C) of the structure.
Figure 1A:
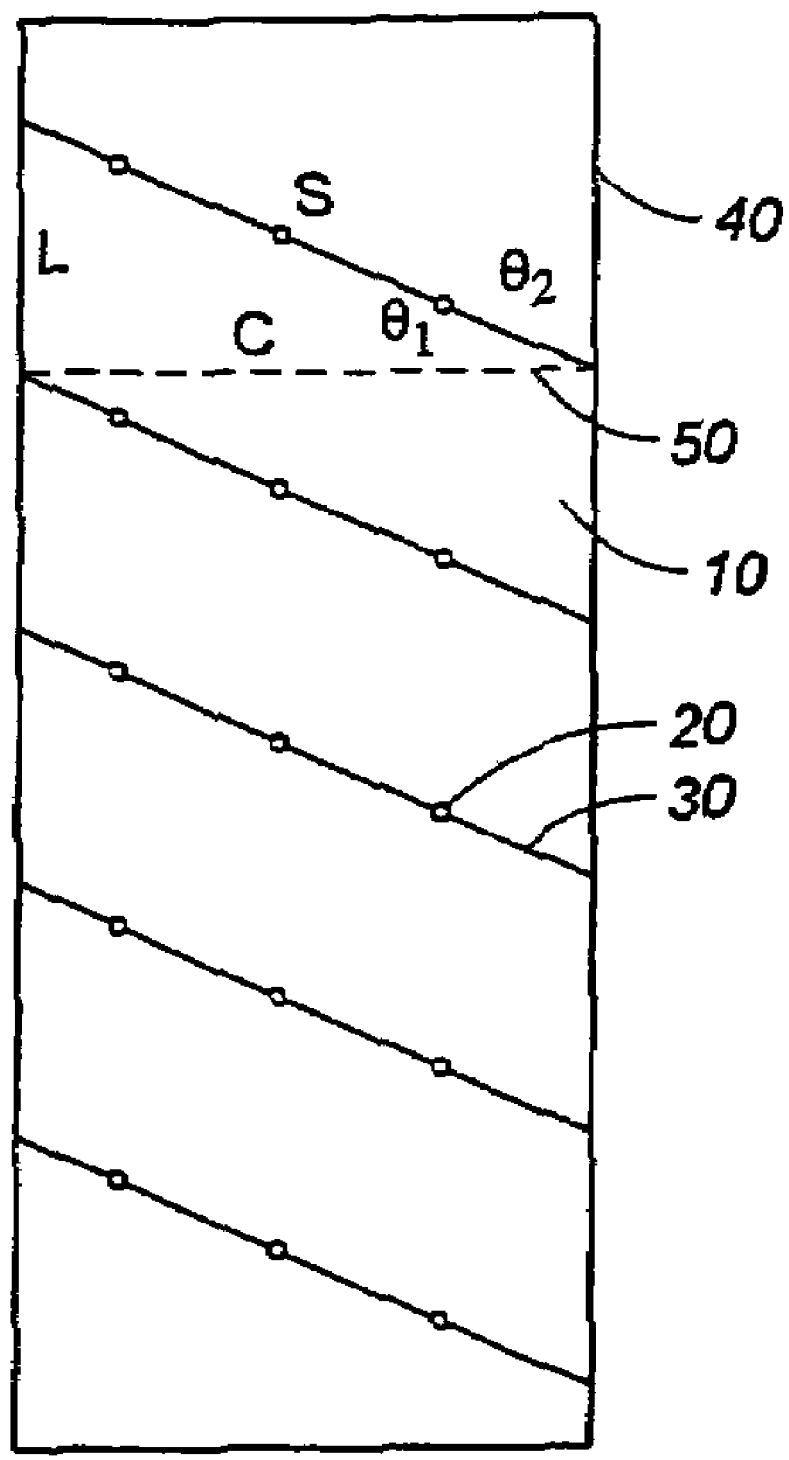
FIG. 1A is a linear perspective of section A in FIG. 1.

Referring now to FIG. 1, an elevational view of a cylindrical structure 10 such as, for example, a tubular structure (e.g., drill pipe) or casing, is illustrated with a plurality of FBG type transducers 20 applied to the structure 10 on a fiber 30 at different preferred wrap angles in sections A, B and C. FIG. 1A is a linear perspective of section A in FIG. 1, illustrating the fiber 30 wrapped around the tubular 10 at a preferred wrap angle represented by $\theta_1$ or $\theta_2$. The preferred wrap angle may be measured relative to a first imaginary reference line 40 extending longitudinally along a surface of the structure 10. Alternatively, the preferred wrap angle may be measured relative to a second imaginary reference line 50 circumferencing the structure 10, which also represents the circumference (C) in FIG. 1A. For purposes of the following description, however, the preferred wrap angle is measured relative to the second imaginary reference line 50 and is represented by $\theta_1$. Nevertheless, $\theta_2$ could be used, instead, by simply substituting $\Pi/2-\theta_2$ for $\theta_1$ or calculating $\theta_1$ based on $\theta_2$ as $\theta_1 = 90° - \theta_2$.

In FIG. 1A, the length of one wrap of fiber 30 around the structure 10 is represented as S. The vertical distance between each wrap of fiber 30 is represented as L. Relationships between $\theta_1$, L, X, S, and C are illustrated by: $L = S*\sin(\theta_1)$ and $C = S*\cos(\theta_1)$. In this transformed geometry, S represents the hypotenuse of a right triangle formed by L, C, and S.

Axial strain along the axis of the structure 10 caused by compaction can be represented as $\epsilon = \Delta L/L$. Axial strain along the axis of the structure 10 caused by compaction can be translated to strain in the transducer 20 and represented as $\epsilon_f = \Delta S/S$, which may manifest itself in the transducer 20 as axial, hoop and/or sheer stress. The relationship between strain ($\epsilon_f$) in the transducer 20 and its wavelength response is therefore, represented by:

$$\Delta\lambda = \lambda(1-Pe)K\epsilon_f$$

where $\Delta\lambda$ represents a transducer wavelength shift due to strain ($\epsilon_f$) imposed on the transducer 20 and $\lambda$ represents the average wavelength of the transducer 20. The bonding coefficient of the transducer 20 to a substrate or system on which the strain is to be measured is represented by K. For simplicity in the examples that follow, the bonding coefficient (K) is assumed to be constant. $P_e$ represents the strain and temperature effect on the index of refraction of the transducer 20. $P_e$ may be a function of strain and temperature, including torque on the transducer 20, but is neglected in the following examples. Since it is well known that temperature variations may impart additional strain to the fiber 30, the transducers 20 and structure 10, which affect the index of refraction in the fiber 30, temperature variations may be considered independently for calibrating the strain measurements. This can easily be done either by a separate temperature measurement that could be performed by mechanically decoupling short lengths of the fiber 30 from the structure 10, using a separate but similar fiber that is entirely decoupled mechanically from the structure 10 or by any other means of measuring the temperature in the vicinity of the structure 10 undergoing the strain measurement.

The foregoing properties may be used to relate the strain ($\epsilon_f$) in the transducer 20 to the axial compaction strain ($\epsilon$) in the structure 10. The strain ($\epsilon_f$) in the transducer 20 can be related to the preferred wrap angle ($\theta_1$) and the strain ($\epsilon$) along the axis of the structure 10 by:

$$\frac{\Delta S}{S} = -1 + \sqrt{\sin(\theta_1)^2 * (1-\epsilon)^2 + \cos(\theta_1)^2 * (1+\nu\epsilon)^2}$$

The Poisson ratio ($\nu$) is an important property of the structure 10, which is relevant to the strain ($\epsilon$) the structure 10 may encounter as illustrated in the examples to follow.

The strain factor relating axial strain ($\epsilon$) in the structure 10 to strain ($\epsilon_f$) transmitted to the transducer 20 and is represented by:

$$m = \frac{-1 + \sqrt{\sin(\theta_1)^2 * (1-\epsilon)^2 + \cos(\theta_1)^2 * (1+\nu\epsilon)^2}}{\epsilon}$$

which may also be translated to:

$$\Delta S/S = m * \Delta L/L = m * \epsilon$$

Comparison of the strain factor (m) to other variables reveals that it is highly sensitive to the preferred wrap angle ($\theta_1$), somewhat sensitive to the Poisson ratio ($\nu$), and quite insensitive to applied axial strain ($\epsilon$).

Application of the Transducers

The primary requirements for sensitivity and resolution are a sufficient number of transducers 20 positioned around the circumference (C) of the structure 10 and adequate vertical spacing between the transducers 20 so that a sinusoidal pattern associated with a bend, buckle, shear or crushing (ovalization) force can be clearly detected and imaged. As demonstrated by the relationships below, sensitivity to axial strain and radial strain, and hence bending strain, is also a function of the preferred wrap angle ($\theta_1$).

Preferably, at least ten transducers 20 per wrap of the fiber 30 are used to adequately capture one cycle of the sinusoidal signal produced by a deformation of the structure 10. It is also desirable to have at least eight to ten turns or wraps of the fiber 30 covering the vertical distance of the structure 10 over which the deformation is expected to occur. Fewer transducers 20 will reduce the resolution and ability to unambiguously distinguish between a bend, buckle, shear or crushing type deformation. In terms of the preferred wrap angle ($\theta_1$) and the diameter (D) (in inches) of the structure 10 the length of structure 10 (in feet) covered by each wrap is represented as:

$$L_1 = \frac{\pi * D * \tan(\theta_1)}{12}$$

In terms of the preferred wrap angle ($\theta_1$) and the diameter (D) (in inches) of the structure 10, the length of one wrap around the structure 10 (in feet) is represented as:

$$S_1 = \frac{\pi * D * \cos(\theta_1)}{12}$$

The total length of the fiber 30 (in feet) based on a preferred number of wraps ($N_w$) around the structure 10 and the length of one wrap ($S_1$) around the structure 10 (in feet) is represented as:

$$S = S_1 * N_w$$

The axial length of the fiber 30 (in feet) along the structure 10 is based on a preferred number of wraps ($N_w$) around the structure 10 and the length of structure 10 (in feet) covered between each wrap is represented as:

$$Z = L_1 * N_w$$

Thus, the preferred number of wraps ($N_w$) around the structure 10 may be determined by the axial length (Z) of the structure 10 wrapped in the fiber 30 divided by the length ($L_1$) of structure 10 covered between each wrap of the fiber 30. In addition to the preferred wrap angle ($\theta_1$), the preferred number of wraps ($N_w$) may be used to determine a preferred application of the fiber 30 and transducers 20 to the structure 10.

The transducer spacing may be as short as 1 centimeter or as long as necessary to accommodate a judicious number of transducers 20 per wrap of the fiber 30 on a structure 10 having a large diameter. The total number of transducers 20 per wrap of the fiber 30 as a function of transducer spacing ($S_g$) (in centimeters) and wrap length ($S_1$) is represented as:

$$n = \frac{2.54 * S_1 * 12}{S_g} = \frac{2.54 * \pi * D * \cos(\theta_1)}{S_g}$$

Assuming that all of the transducers 20 on the fiber 30 are within the wrapped portion of the fiber 30, then the total number of transducers 20 on the fiber 30 is represented as:

$$N = \frac{2.54 * S * 12}{S_g} = \frac{2.54 * N_w * \pi * D * \cos(\theta_1)}{S_g}$$

Similarly, the preferred transducer spacing ($S_g$) may be easily determined with a known preferred number of transducers (N) and a predetermined total length (S) of fiber 30.

Roughly, the maximum number of transducers 20 that can be used on one fiber 30 with this technique is about 1000. Thus, the preferred wrap angle ($\theta_1$), the preferred number of wraps ($N_w$) and the preferred number of transducers (N) may be used to determine a preferred application of the fiber 30 and transducers 20 to the structure 10.

Figure 2:
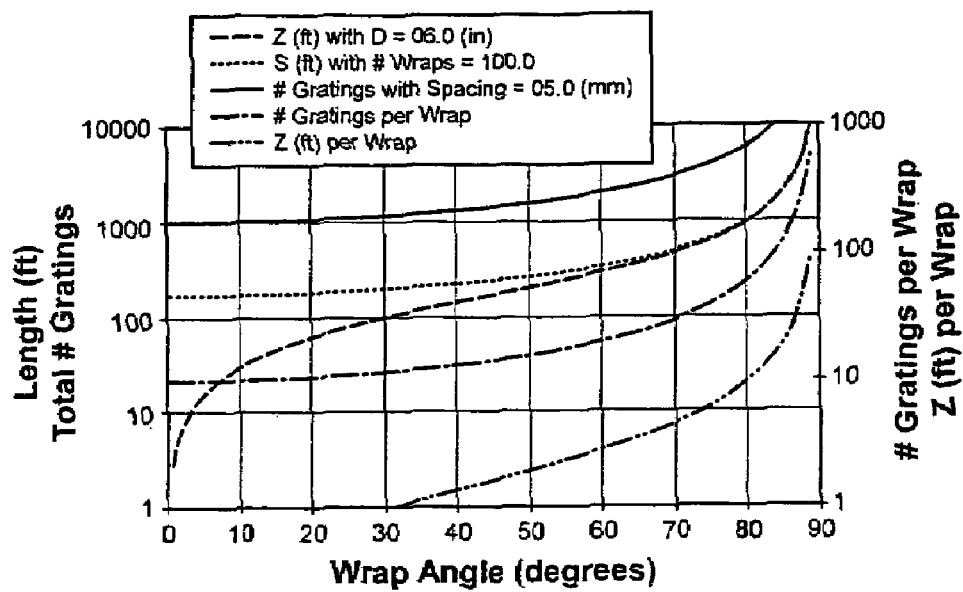
FIG. 2 is a graph of illustrating the determination of preferred number of transducers and preferred number of wraps needed to cover a predetermined length.

Using the previous equations, plots such as the one in FIG. 2 may be compiled and used to determine the preferred number of transducers (N) and the preferred number of wraps ($N_w$) needed to cover a predetermined length and diameter for the structure 10 and the preferred transducer spacing ($S_g$). Plotted on the left axis are the length of the fiber (S), the axial length (Z) of the structure 10 wrapped in the fiber 30 and the total number of gratings (transducers) (N) that may be compared to a wrap angle range for a predetermined number of wraps ($N_w$) and a predetermined transducer spacing ($S_g$). Plotted on the right axis are the total number of gratings (transducers) per wrap (n) and the axial length ($L_1$) of the structure 10 covered between each wrap that may be compared to a wrap angle ($\theta_1$) range for a predetermined transducer spacing ($S_g$) and a preferred number of wraps ($N_w$).

In FIG. 2, D=6 inches), $N_w$=100 and $S_g$=5 mm. This figure shows that wrap angles between 20 and 40 degrees tend to optimize resolution considering the length of fiber (S) and the length of the structure (Z) being monitored. This information may be used with the strain factor (m) to design a preferred application of the fiber 30 to the structure 10.

Figure 3:
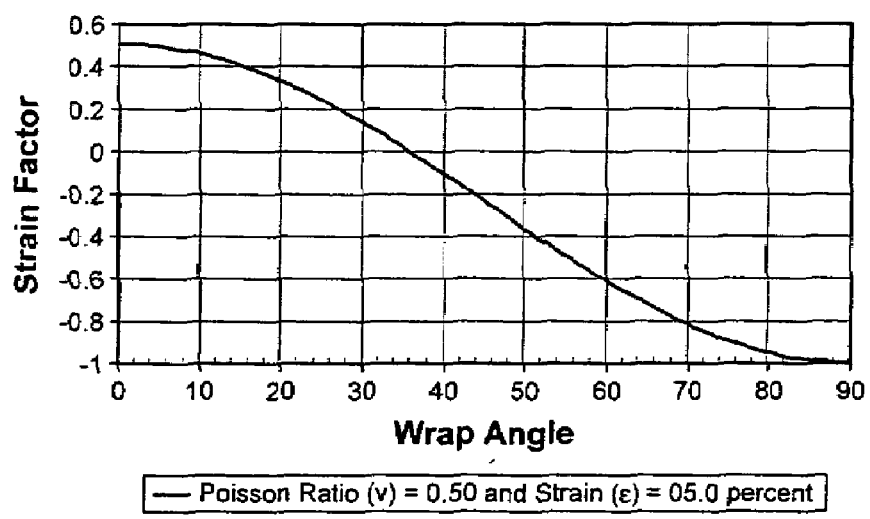
FIG. 3 is a graph illustrating the relationship between the strain factor and various wrap angles.

FIG. 3, illustrates the relationship between the strain factor (m) and various wrap angles. A predetermined Poisson ratio (v) of 0.5 was chosen based on the observation of steel tubular performance after yielding at high compaction strains. A predetermined strain ($\epsilon$) of 5 percent was selected based upon the maximum anticipated strain the structure may encounter.

Based on these structural parameters the strain factor (m) may be determined for each wrap angle illustrated in FIG. 3. The results in FIG. 3 reveal that the strain each transducer experiences can be decreased or even reversed (compression to tension) by carefully choosing the preferred wrap angle ($\theta_1$).

The ability to easily regulate the amount of strain the fiber and each transducer will be exposed to, and even the sign of the strain (tension vs compression) is very important. Most conventional fiber sensors manufactured from glass can be exposed to no more than one or two percent strain (in tension) before damage or failure occurs. Compressional strain in fiber sensors manufactured from glass is even more problematic. Thus, high axial compressional strain exerted on tubular structures in compacting environments can be converted to mild extensional strain in the fiber sensor by simply adjusting the wrap angle. The same principle may be applied to recalculate the amount of strain on other conventional sensor systems that may be used.

Figure 4:
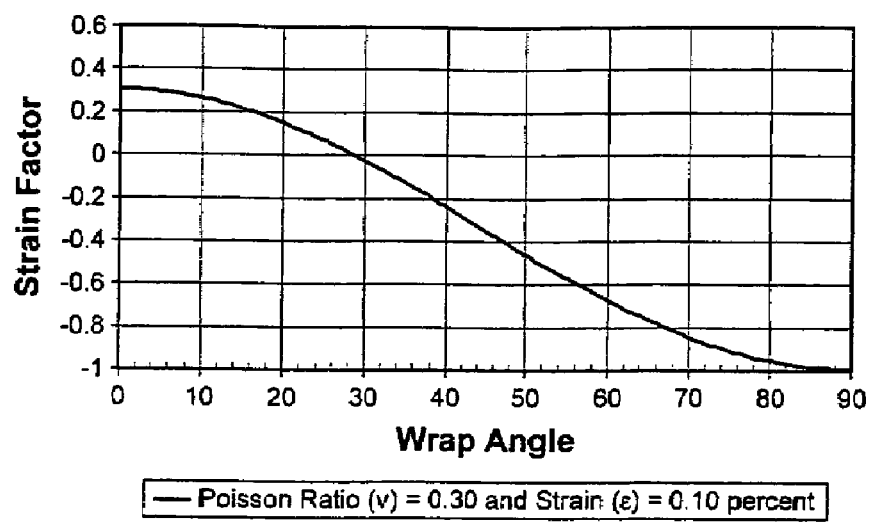
FIG. 4 is a graph illustrating the relationship between strain factor and wrap angles according to a predetermined Poisson ratio.

In FIG. 4, the strain factor (m) is illustrated for each wrap angle according to a predetermined Poisson ratio (v) of 0.3 and a predetermined strain ($\epsilon$) of 0.10 percent for the structure analyzed. FIGS. 3 and 4 illustrate that, at a zero-degree wrap angle, the strain factor (m) is equal to the Poisson ratio (v). In other words, the compressional strain ($\epsilon$) on the structure is translated to an axial expansion defined by Poisson's ratio (v). Likewise, in the limit of no wrap (vertical application along casing or a 90-degree wrap angle) the extension or compression of the structure can be measured directly. The latter has the disadvantage that, in high compressional strains, the fiber and/or transducers are likely to be damaged and/or undergo buckling and mechanically disconnect from the structure.

For steel behaving elastically, the nominal Poisson ratio (v) is near 0.3. It has been observed that the Poisson ratio (v) of tubular structures undergoing high compaction strains (beyond the elastic limit) is better approximated at 0.5. This is a theoretical limit for the conservation of volume. The Poisson ratio (v) may therefore, be predetermined according to the anticipated or maximum strain the structure may encounter, however, may be between about 0.3 and about 0.5 for tubular steel structures. As a general rule, the Poisson ratio (v) may be approximated at 0.5 if the predetermined strain is at least 0.3 percent or greater in a tubular steel structure.

The principles illustrated in FIG. 3 and FIG. 4 may be used to determine a preferred application of the transducers 20 to the substantially cylindrical structure 10 in FIG. 1A for monitoring deformation of the structure in various formation environments. According to one method, a preferred wrap angle range (e.g., between 0 and 90 degrees) may be selected for determining the relative strain factor (m) associated with each wrap angle in the preferred wrap angle range. A broad wrap angle range between 0 degrees and 90 degrees may be preferred, however, different, narrower, ranges may be selected. The strain factor (m) should be determined for at least one wrap angle within the preferred wrap angle range. The preferred wrap angle ($\theta_1$) within the preferred wrap angle range may be determined based on at least one determined strain factor (m), and used to determine the preferred application of the transducers 20 to the structure 10 in FIG. 1A. As illustrated in Table 1, a number of other variables, including the preferred number of transducers (N) and the preferred number of wraps ($N_w$), may also be considered in determining the preferred application of the transducers 20 to the structure 10 based on sensitivity and resolution requirements.

Determining the preferred wrap angle ($\theta_1$) within the preferred wrap angle range may, alternatively, be based on a preferred strain factor range comprising a plurality of the strain factors determined in the manner described above. The determined strain factor or determined strain factor range may be selected to determine the preferred wrap angle ($\theta_1$) within the preferred wrap angle range based on a maximum strain the transducer 20 and/or fiber 30 can withstand. If a transmission means other than the fiber 30 is used, or wireless transducers are used, then the determined strain factor or determined strain factor range used to determine the preferred wrap angle ($\theta_1$) within the preferred wrap angle range may be based on a maximum strain the alternative transmission means and/or transducers, or wireless transducers, can withstand.

In FIG. 3, for example, the predetermined Poisson ratio (v) and anticipated axial strain ($\epsilon$) reveal a need for sensitivity to high compaction strains. Assuming the transducers and/or fiber are limited to about 2 percent strain before failure occurs, then the wrap angle at which the transducers and/or fiber may fail at 5 percent anticipated strain on the structure is determined by dividing the maximum strain the transducer and/or fiber may withstand (0.02) by the anticipated strain (0.05), which reveals a strain factor (0.4) that corresponds with a wrap angle of about 15 degrees. Consequently, a wrap angle of greater than about 15 degrees is required to prevent damage to the transducers and/or fiber and preferably may be about 30 degrees. A wrap angle greater than about 35 degrees, where the strain factor is zero, may produce undesirable compression and buckling in the fiber and/or transducers.

Once a preferred application of the transducers has been determined, the transducers may be applied to the structure 10 along a preferred application line represented by the fiber 30 in FIG. 1A. The preferred wrap angle may be formed between the preferred application line and the first imaginary reference line 40 or the second imaginary reference line 50.

The transducers 20 and the fiber 30 may be applied to an exterior surface of the structure 10 (as illustrated in FIG. 1), an interior surface of the structure 10, a channel within the structure 10 or be made an integral component of the structure 10 when forming or manufacturing the structure 10. In the event that the tubular structure 10 comprises a screen assembly having multiple screen components, including a sand screen, the transducers 20 and the fiber 30 may be applied to an interior surface and/or an exterior surface of one of the multiple screen components or in a channel within any one of the multiple screen components or between any two of the component layers. Additionally, the transducers 20 and the fiber 30 may be applied to an exterior surface of one of the multiple screen components and the interior surface of another one of the multiple screen components.

Furthermore, the transducers 20 and the fiber 30 may be applied to the structure 10 in a protective sheath and/or a protective sheet coating the transducers 20 and the fiber 30, provided that the protective coating is capable of transferring strain from the structure 10 to the transducers 20. Acceptable protective coatings may comprise, for example, a metal, a polymer, an elastomer, a composite material or a thin tube comprising one or more of these materials that is flexible yet capable of being applied to the structure 10 in a way that couples the strain experienced by the structure 10 with the transducers 20. In the event the structure 10 must be run in a well bore, the transducers 20 and fiber 30 may be applied before the structure 10 is run in the well bore.

Alternatively, the transducers 20 and the fiber 30 may be applied to the structure 10 after it is run in the well bore using a conduit, or may be applied to the interior or exterior surface of the structure 10 after the structure 10 is run in the well bore. Any conventional conduit capable of being coupled to the structure 10 is acceptable. Acceptable materials for the conduit may comprise, for example, a metal, a polymer, an elastomer, a composite material or a thin tube comprising one or more of these materials that is flexible yet capable of being applied to the structure 10 in a way that couples the strain experienced by the structure 10 with the transducers 20.

The transducers 20 and the fiber 30 may be introduced into an opening in the conduit and positioned therein with a fluid capable of securing the transducers 20 and the fiber 30 within the conduit and transferring strain on the structure 10 to each transducer 20. The fluid may, for example, comprise any conventional polymer, polymer solution, polymer precursor, or epoxy. The fluid may also be used to convey the transducers 20 and the fiber 30 through the conduit. Additionally, the transducers 20 and the fiber 30 may be positioned in the conduit with the fluid by applying force on either, or both, ends of the fiber 30 to push and/or pull the same through the conduit. For example, a weighted object may be attached to the leading end of the fiber 30 to propel (pull) the fiber 30 and transducers 20 through the conduit. The conduit may be positioned within the structure 10 along the preferred application line or on the structure 10 along the preferred application line. In either case, the preferred wrap angle may be formed between the preferred application line (represented by the fiber 30 in FIG. 1A) and the first imaginary reference line 40 or the second imaginary reference line 50. If the structure 10 comprises a screen assembly having multiple screen components, the conduit may be positioned within one of the multiple screen components along the preferred application line or on one of the multiple screen components along the preferred application line.

Application of the transducers 20 and fiber 30 to a structure 10 after it has been positioned in a well bore may be preferred in that this technique does not require the tubular structure to be rotated or a fiber spool to be rotated about the structure during application of the transducers 20 and the fiber 30. Similar advantages may be preferred by application of the transducers 20 and the fiber 30 to the structure 10 in a protective sheet, which may be positioned on the structure 10 and fastened along one side as described further in U.S. Pat. No. 6,854,327.

Multiple and Variable Wrap Angles

As reservoir depletion progresses, the sensitivity/resolution requirements and strain factors are likely to change. By combining multiple wrap angles over a single zone of the formation, the sensitivity and dynamic range of the measurements may be extended. For example, a fiber wrapped at 20 degrees may fail at one level of strain while the same fiber wrapped at 30 degrees or more may not fail at the same level of strain or at a slightly higher level of strain.

Another advantage multiple wrap angles provide is better characterization of the change in the Poisson ratio (v) as the structural material yields under higher strains. Common steel used in tubulars may have a Poisson ratio of near 0.3 while it is elastic but trends toward 0.5 after the material yields. Applying the fiber 30 and transducers 20 at two or more wrap angles, as illustrated in FIG. 1, will allow the characterization of this change. This is particularly important for fibers that are wrapped near the angle that would null the fiber strain. This null point changes primarily as a function of the Poisson ratio (v) for the structure 10. With multiple wrap angles, this behavior can be measured directly on the structure 10 in the well while it is undergoing compaction strain. Thus, if different wrap angles may be preferred due to different forces acting on the tubular structure, the methods described above in reference to Tables 2 and 3 may be used to determine another preferred wrap angle within the preferred wrap angle range. The preferred application of the transducers 20 may be based on the preferred wrap angle and another preferred wrap angle and applied to the structure 10 over the same section or over different sections as illustrated by section B and sections A, C in FIG. 1, respectively. In either case, the preferred wrap angle and another preferred wrap angle may each be determined according to a respective determined strain factor (m). Each respective determined strain factor (m) may be selected according to a predetermined force and another predetermined force to be applied to the structure 10, over the same section or over different sections, which impacts the same by variations in the Poisson ratio (v) and axial strain ($\epsilon$).

Restrictions on the number of transducers, the wrap length and the transducer spacing may also be overcome using multiple wrap angles. Therefore, multiple wrap angles may be used to extend the measuring length of a single region along the structure or span multiple zones along the structure as illustrated in sections A, B and C of FIG. 1. The addition of multiple wrap angles may also be used to branch into multiple structures such as multi-lateral wells.

Although the wavelength response is more complicated, the application of the fiber 30 and the transducers 20 at variable wrap angles may also be desirable. Configurations utilizing multiple and variable wrap angles over a single section of the structure 10, like section B in FIG. 1, may be preferred. Other configurations, such as those suggested in U.S. Pat. No. 6,854,327, may be used, however.

The present invention will now be described further with reference to its application in different formation environments such as, for example, formation shear and formation compaction. In each of the examples to follow, a cylindrical structure was tested using a Distributed Sensing System® manufactured by Luna Innovations Incorporated under license from NASA. The LUNA INNOVATIONS® Distributed Sensing System® utilizes patented technology covering an optical fiber containing multiple FBG sensors, and a projection device or monitor capable of imaging a wavelength response produced by the FBG sensors as a result of structural strain detected by the FBG sensors. The present invention, however, is not limited to such technology by the following examples, and other transmission means and transducers/sensors may be used as described hereinabove.

Formation Shear

Wells crossing a slip zone or a fault may be in danger of shearing. A shearing zone could be encountered when placing a well across a fault, through salt and/or across weak shale in a tectonically active area or an area undergoing compaction, such as the overburden area.

Shear movement may entirely shear off the well bore or at least restrict passage of tubing, workover equipment, and the like. It is, therefore, desirable to detect and measure the rate of shearing so that hydrocarbon or fluid off-take, well location, well design and similar considerations can be modified to mitigate or prevent damage to the tubular structure and/or casing in the future.

Conventional techniques used to detect and measure shear movement often require tools such as gyroscopes or other devices to take measurements. For various reasons it may be impractical or impossible to run such conventional logging tools into the well. For example, the well may already have sustained considerable damage so that it cannot be entered.

Transducers, however, may be pre-positioned on the tubular structure and/or casing without having to run conventional logging tools into the well. Accordingly, in-situ measurements can be taken of shear forces at any time without disturbing the well and with essentially no additional cost. The onset of damage can be observed substantially in real time so that remedial action can be taken as soon as possible.

Field experience reveals that shearing and buckling may result in a loss of clearance, or a complete shear-off, typically over a 3- to 6-foot interval of the tubular structure or casing. Thus, a preferred application of the transducers to such a structure in a shearing zone should be designed for at least this sensitivity.

Figure 5:
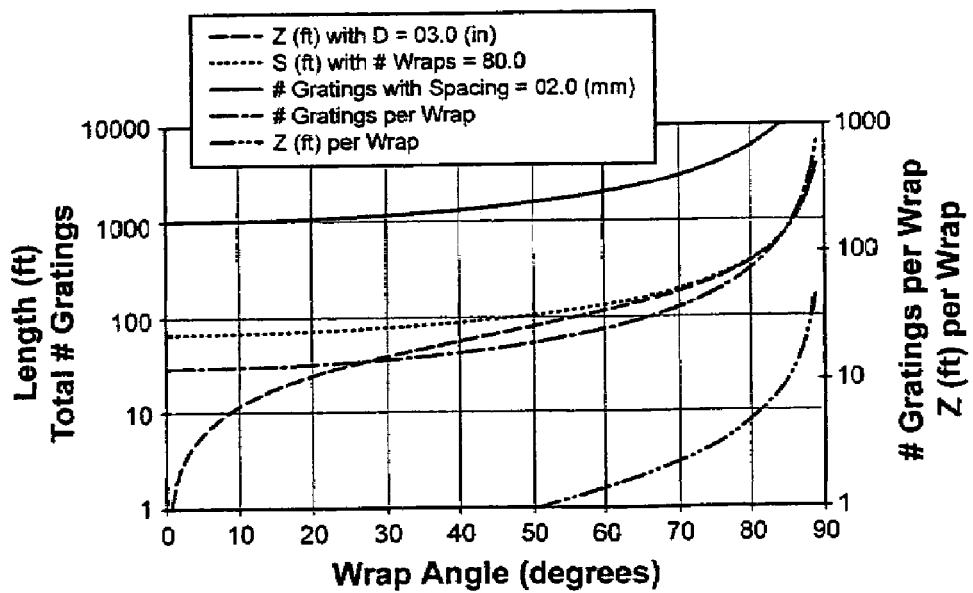
FIG. 5 is a graph illustrating the relationship between the length of sensing fiber and the length of the tubular structure versus the wrap angle.

Assuming a 3-inch diameter tubular structure to be monitored across a slip or shear zone, the location of which is known to be within ten feet, requires at least 20 feet of coverage along the tubular. Applying the principles taught by the present invention to the known variables illustrated in FIG. 5 reveals that about 67 feet of sensing fiber is needed to cover about 24 feet of the tubular structure assuming a preferred wrap angle of about 21 degrees. Given a preferred transducer spacing of about 2 centimeters, about 12 transducers per wrap are recommended, which is greater than the minimum recommendation of 10 transducers per wrap. The total number of transducers is about 1000.

EXAMPLE 1

Figure 6:
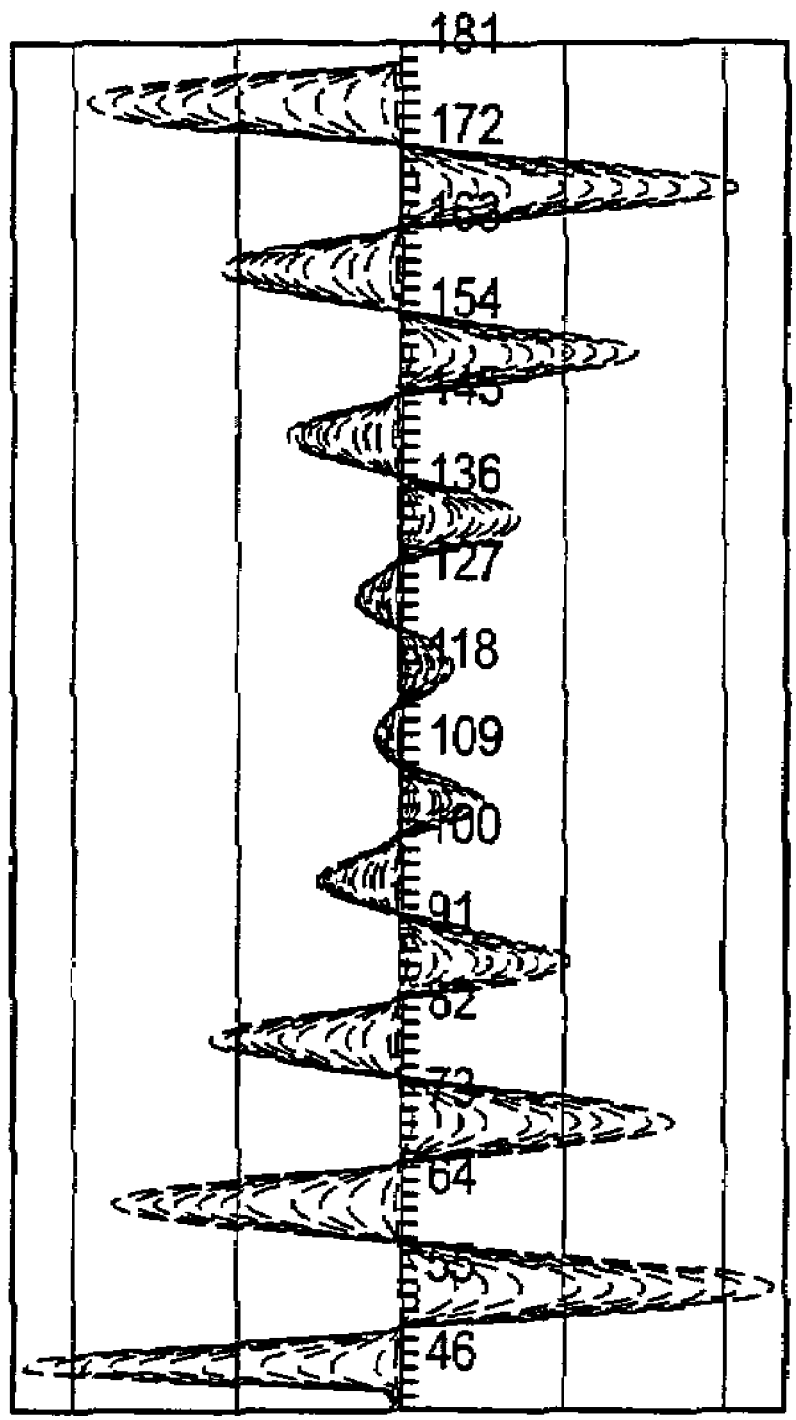
FIG. 6 is a graphical illustration of the resulting wavelength response, relative to numbered transducer, from a cylindrical structure undergoing offset shear in a controlled test.

FIG. 6, illustrates the resulting wavelength response, relative to each numbered transducer, from a cylindrical structure undergoing offset shear in a controlled test. The cylindrical structure is three (3) inches in diameter and twenty-four (24) inches long. Although the transducer spacing along the optical fiber in this test is about 1 centimeter, a spacing of 2 centimeters may be adequate to measure the same shear response in a cylindrical structure with the same diameter. A preferred wrap angle of about 20 degrees was used. The detectable variation in wavelength response, representing lateral offset, was between 0.001 inches up to about 0.600 inches.

In this example, a 0.001-inch lateral offset translates into a dogleg in the structure of about less than one-half degree for each one hundred-foot section of the structure, which is inconsequential. However, a lateral offset of about 0.1 inch over the same length of structure translates into a dogleg of approximately 48 degrees for each one hundred-foot section of the structure, which could prevent entry with production logging tools. Knowing the magnitude of the lateral offset (dogleg) before attempting entry could therefore, prevent lost and stuck logging tools and lost wells.

The wavelength response illustrated in FIG. 6 may be imaged, in real time, on a projection device such as the monitors manufactured by Luna Innovations. The detection of variations in the wavelength response at each transducer as the structure is being monitored will reveal changes in the deformation of the structure and what type of force is causing the structure to deform. Variations in the wavelength response are therefore, revealed by variations in the amplitude of the wavelength response at each transducer. The ability to detect strain on the structure and image the same in the form of a wavelength response on a projection device, however, is not limited to a cylindrical structure and may be applied to most any object capable of transferring strain from the object to the transducer.

Figures 7, 7A:
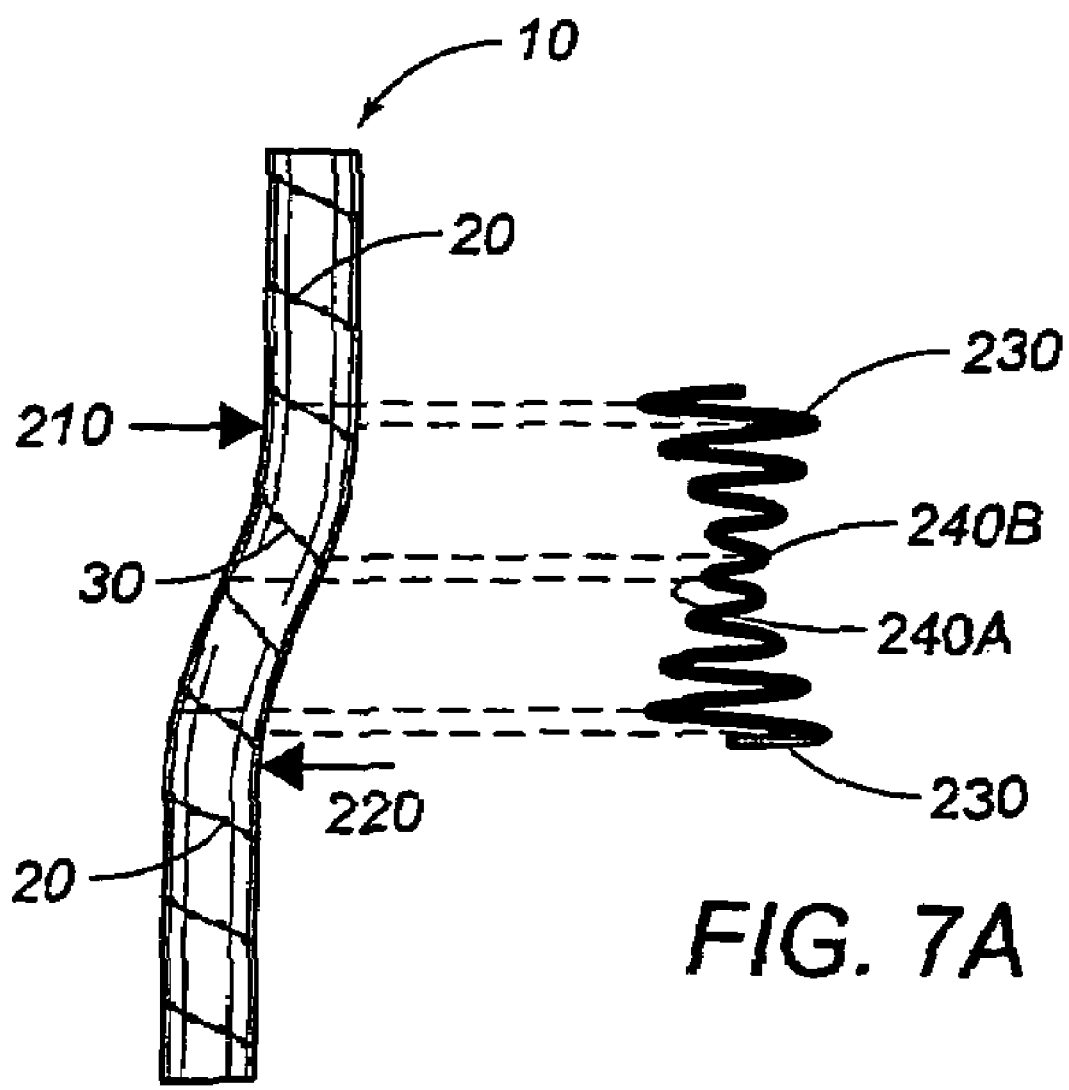
FIG. 7 is an elevational view of a cylindrical structure illustrating shear forces on the structure.
FIG. 7A is an image of a wavelength response illustrating the corresponding strain measured by the transducers in FIG. 7.

FIG. 7 represents a simple illustration of a shear force applied to the structure 10. Here, the structure 10 is subjected to a shearing force 210 on one side of the structure 10 and another shearing force 220 on another side of the structure 10. The wavelength response, representing strain on the structure 10 measured by the transducers 20, associated with the shearing forces 210, 220 is periodic and approximately sinusoidal as illustrated in FIG. 7A. The period of wavelength response or signal is equal to about one cycle per wrap of the fiber 30 around the structure 10. The amplitude of the periodic signal is determined by the magnitude of shear forces 210, 220. The wavelength response in FIG. 7A is positioned adjacent the structure 10 in FIG. 7 to illustrate points of strain on the structure 10 and the corresponding wavelength response produced as a result of such strain. For example, the strain on the structure 10 between the shear forces 210, 220 is minimal compared to the strain on the structure 10 near each shear force 210, 220 as illustrated by the maximum wavelength response 230 and minimal wavelength responses 240A, 240B. The minimal wavelength responses 240A, 240B also illustrate how the shear forces 210, 220 cause the structure 10 to compress and stretch (in tension), respectively. The application of pre-positioned transducers 20 on the structure 10 thus, enables in-situ detection of strain on the structure 10, which can be translated through well-known conventional means and imaged in real time.

Formation Compaction

Axial compaction is commonly measured with radioactive tags and special logging tools, which typically requires shutting in the well. Measurement of strain on the tubular structure or casing below one percent is difficult to achieve, however, with these conventional techniques. At higher strains, a bend or a buckle in the casing or tubular structure is also difficult to detect without pulling the production tubing and running acoustic or mechanical multi-finger calipers or gyroscopes into the well.

The disadvantages associated with conventional means of detecting and measuring strain induced by axial compaction may be avoided with pre-positioned transducers. In other words, the application of pre-positioned transducers on the structure may be used for in-situ detection and measurement of axial compaction forces in the manner described above.

EXAMPLE 2

In this example, accurate measurements of low strain and high sensitivity to bending or buckling induced by axial compaction are important objectives. A thin-walled PVC pipe was tested using the weight of the pipe, horizontally suspended by its ends, as the applied force. A preferred wrap angle of about 20 degrees was used to apply the transducers and optical fiber to a 10-foot long section of the pipe with a 6.5-inch diameter. A 5-centimeter transducer spacing was used to resolve the wavelength response from a buckle or a bend.

Figure 8:
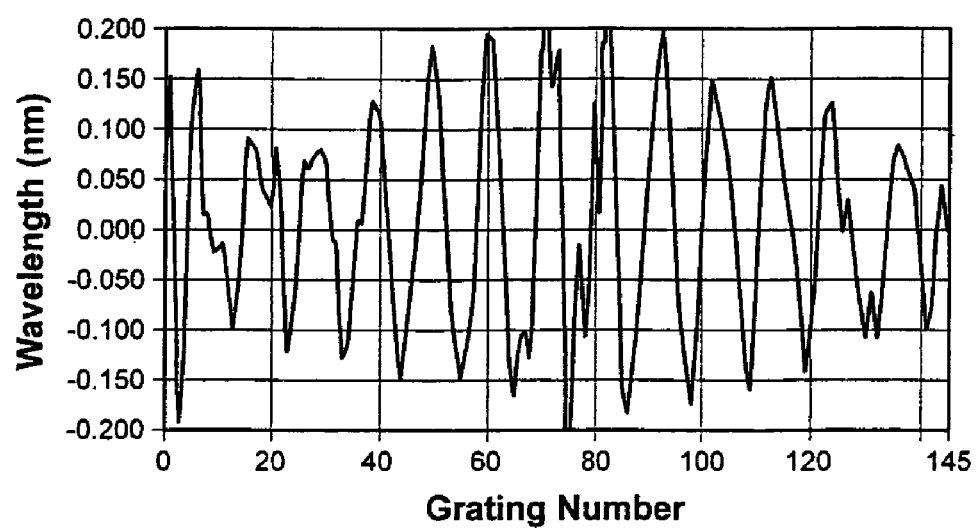
FIG. 8 is a graph illustrating the wavelength response resulting from the lateral force applied by the weight of a pipe, plotted as wavelength versus grating number.

In FIG. 8, the wavelength response resulting from the lateral force applied by the weight of the pipe is illustrated. A maximum lateral offset of about 0.07 inches was detected. The wavelength response in FIG. 8 clearly reveals a bend or a buckle because one period or cycle of the wavelength response corresponds to one wrap of the fiber. A 0.07-inch lateral offset represents less than a 7-degree bend or buckle for each one hundred-foot section of the pipe, which is significant and can be detected by conventional caliper and acoustic imaging tools. In order to run such tools into the well, the well must be shut in and the production tubing must be pulled.

EXAMPLE 3

Figure 9:
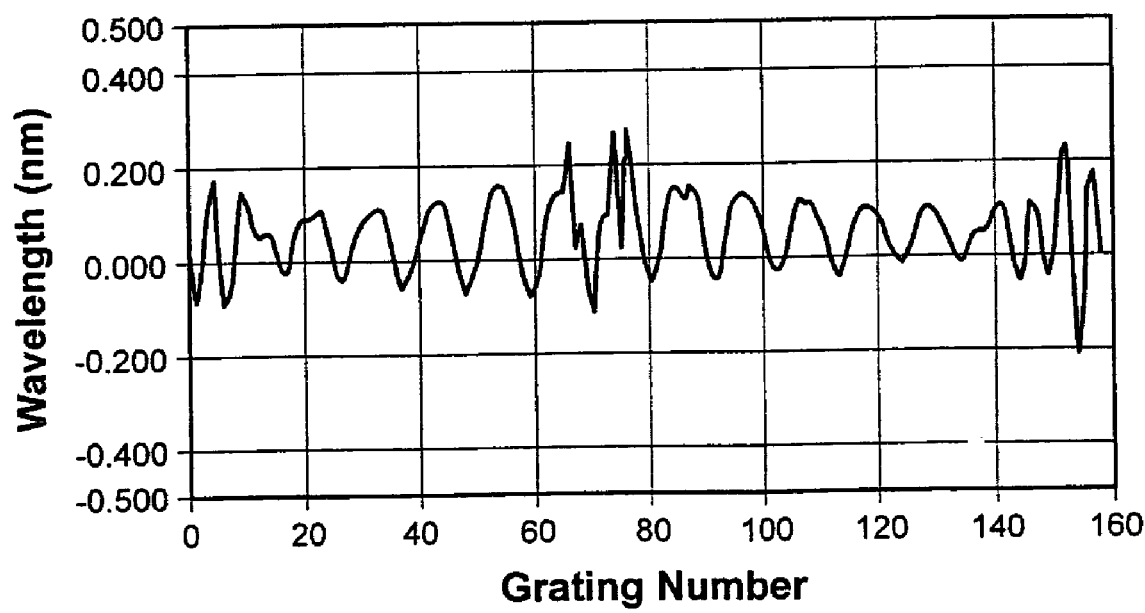
FIG. 9 is a graph illustrating test results for the same pipe as used for FIG. 8 horizonally suspended at each end and a weight hung from the center of the pipe.

In this example, the same pipe was tested using a weight hung from the center of the pipe, which was horizontally suspended at each end. The lateral offset due to a bend is about 0.228 inches. As illustrated in FIG. 9, a relatively clean periodic signal is apparent everywhere except at the ends and at the center of the wavelength response where the weight is hanging and distorting the signal. The distorted signals are a special case related to pipe crushing caused by local loading on the pipe.

Figures 10, 10A:
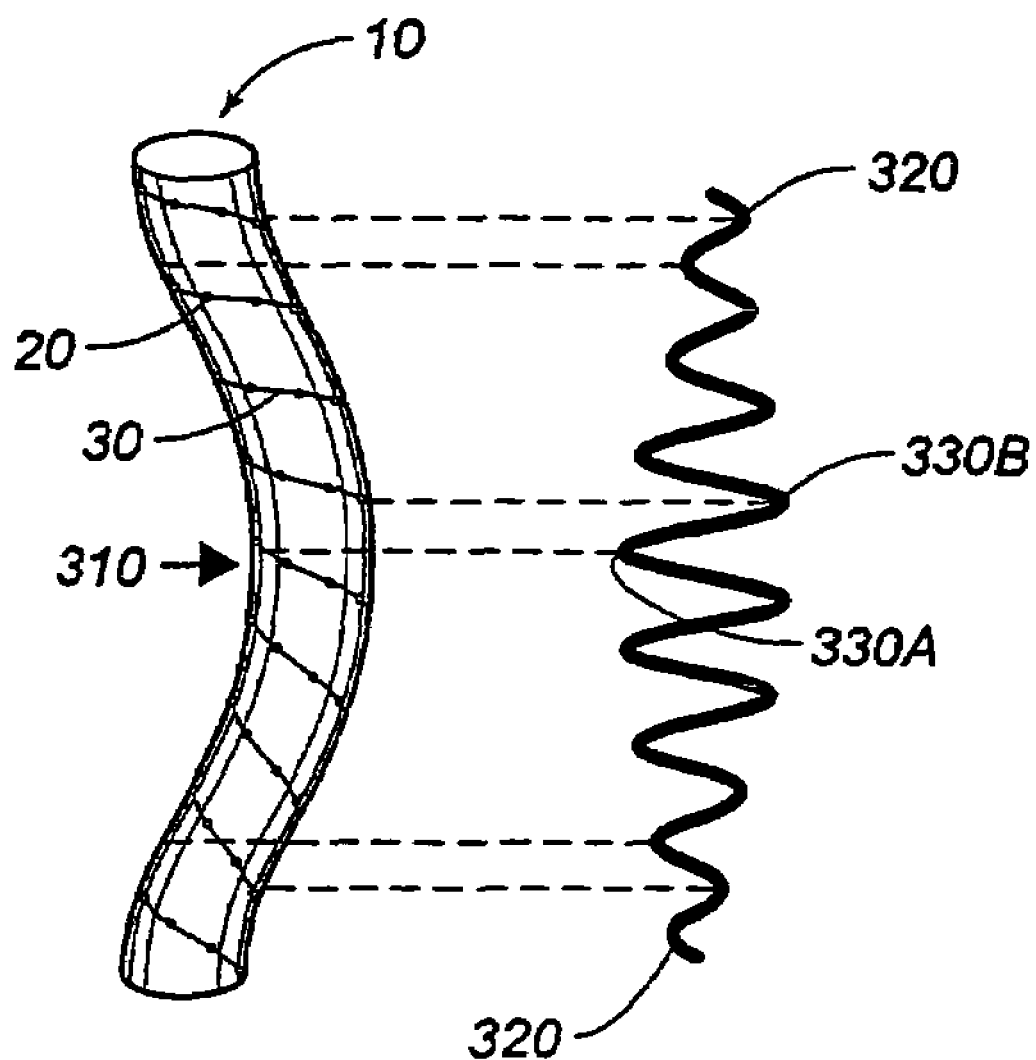
FIG. 10 is an elevational view of a cylindrical structure illustrating bending forces on the structure.
FIG. 10A is an image of a wavelength response illustrating the corresponding strain measured by the transducers in FIG. 10.

FIG. 10 represents a simple illustration of a lateral force on the structure 10 induced by axial compaction. Here the structure 10 is subjected to a lateral force 310 on one side of the structure 10. The wavelength response, representing strain on the structure 10 measured by transducers 20, associated with the lateral force 310 is periodic and approximately sinusoidal as illustrated in FIG. 10A. The period of the wavelength response or signal is equal to about one cycle per wrap of the fiber 30 around the structure 10. The amplitude of the periodic signal is determined by the magnitude of the lateral force 310. The wavelength response in FIG. 10A is positioned adjacent the structure 10 in FIG. 10 to illustrate points of strain on the structure 10 and the corresponding wavelength response produced as a result of such strain. For example, the strain on the structure 10 near the lateral force 310 is greater compared to the strain on the structure 10 at each end as illustrated by the maximum wavelength responses 330A, 330B and the minimal wavelength response 320. The maximum wavelength responses 330A, 330B also illustrate how the lateral force 310 causes the structure 10 to compress and stretch (in tension), respectively.

EXAMPLE 4

Figure 11:
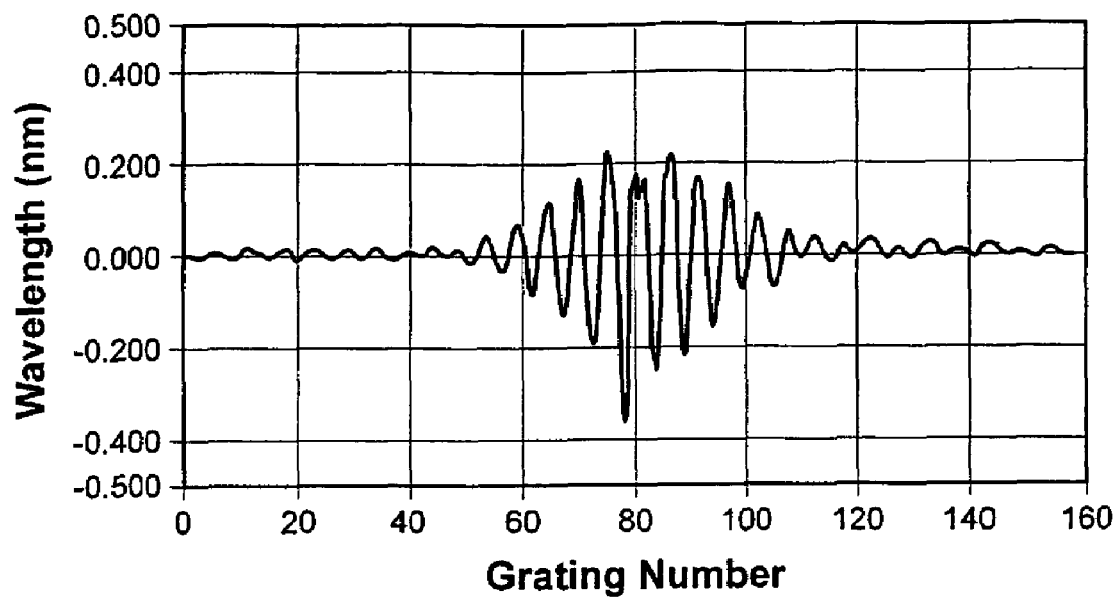
FIG. 11 is a graph illustrating the wavelength response resulting from the application of a crushing force applied near the center of the pipe of FIG. 8, plotted as wavelength versus grating number.

In addition to detecting a bend or a buckle, the onset of ovalization or crushing forces may also be detected and distinguished from a bend or a buckle. A pure ovalization or crushing force should produce a pure ovalization wavelength response. In this example, the same pipe was tested with clamps that were applied as a crushing force near the center of the pipe and slightly tightened with the orientation of the applied force aligned across the diameter of the pipe so as to slightly decrease its cross-sectional diameter. The resulting wavelength response is illustrated in FIG. 11, below, and reveals a period of about two cycles per wrap as opposed to one cycle. In this example, the minimum diameter is decreased by 0.05 inches due to the applied crushing force.

EXAMPLE 5

Figure 12:
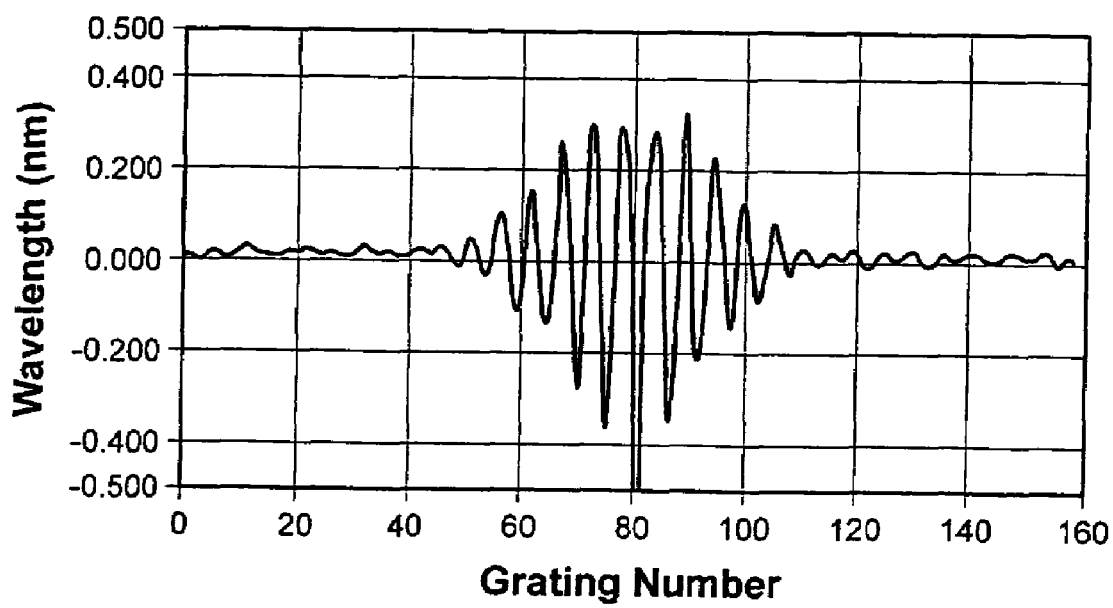
FIG. 12 is a graph illustrating the wavelength response for the pipe of FIG. 11, plotted as wavelength versus grating number, wherein the clamps near the center of the pipe have been rotated 90 degrees.

In this example, the same pipe was tested by rotating the clamps near the center of the pipe 90 degrees. The resulting wavelength response is illustrated in FIG. 12, below, and also reveals a period of about two cycles per wrap. In this example, the minimum diameter is decreased by 0.07 inches.

The increased strain (and therefore deformation) is obvious when comparing FIG. 11 and FIG. 12. It is a simple matter to scale the resulting shift in wavelength to a strain and the resulting strain to a relative crushing.

Figures 13, 13A:
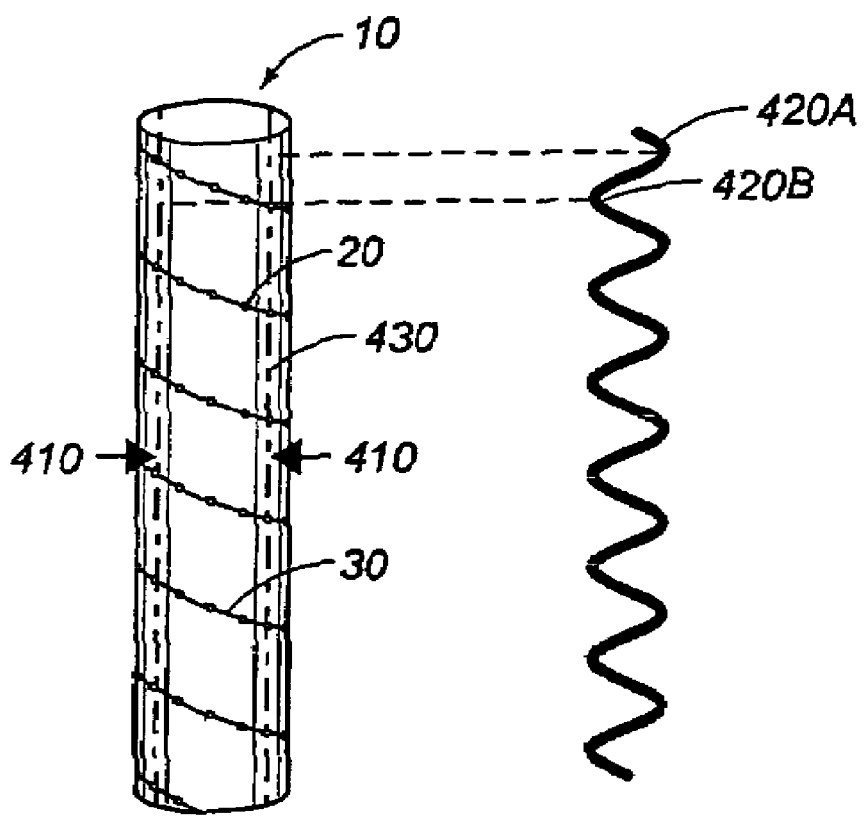
FIG. 13 is an elevational view of a cylindrical structure illustrating crushing or ovalization forces on the structure.
FIG. 13A is an image of a wavelength response illustrating the corresponding strain measured by the transducers in FIG. 13.

FIG. 13 represents a simple illustration of a crushing force on the structure 10 induced by axial compaction. Here, the structure 10 is subjected to a crushing force 410 on all sides of the structure 10. The wavelength response, representing strain on the structure 10 measured by transducers 20, associated with the crushing force 410 is a substantially constant periodic signal as illustrated in FIG. 13A. The period of the wavelength response or signal is equal to about two cycles per wrap of the fiber 30 around the structure 10, which is easily distinguished from the wavelength response exhibited by a bend or a buckle discussed in the examples above. The amplitude of the periodic signal is determined by the magnitude of the crushing force 410. The wavelength response in FIG. 13A is positioned adjacent the structure 10 in FIG. 13 to illustrate points of strain on the structure 10 and the corresponding wavelength response produced as a result of such strain. For example, the strain on the structure 10 is substantially constant around the structure 10 as illustrated by the substantially constant wavelength responses 420A, 420B.

Figure 13B:
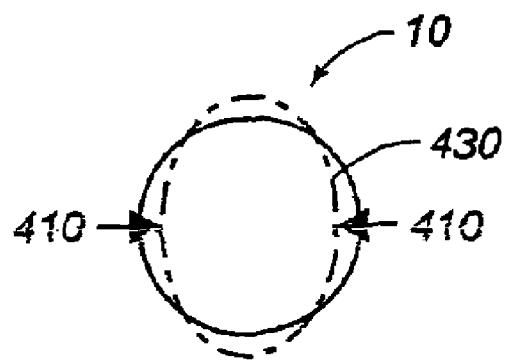
FIG. 13B is a top view of FIG. 13.

In FIG. 13B, an end view of FIG. 13 illustrates the crushing force 410 and the resulting deformation of the structure 10 illustrated by the dashed line 430.

Figure 14:
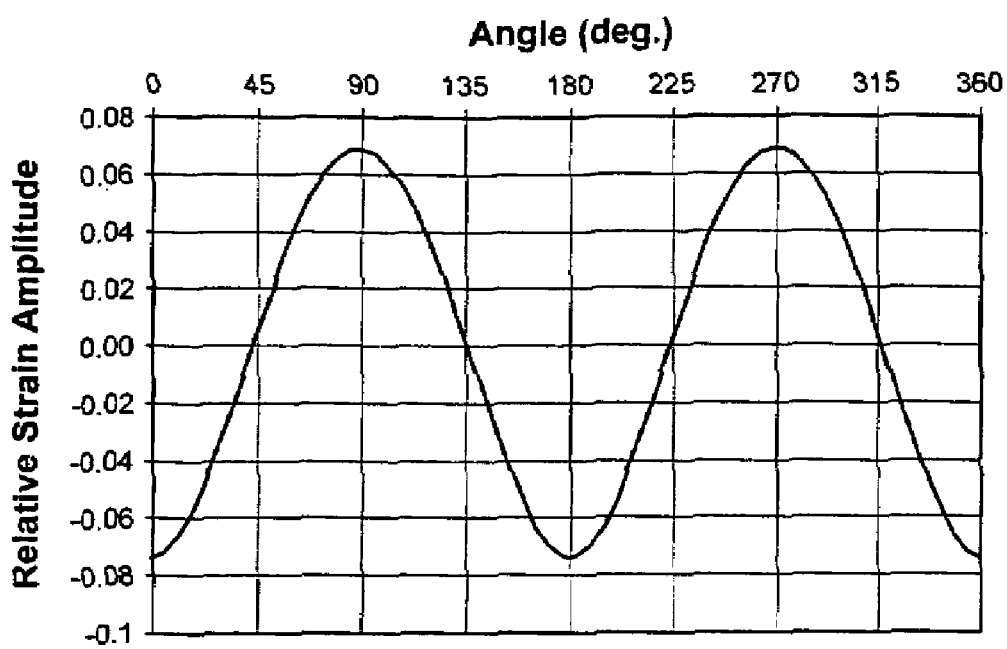
FIG. 14 is a plot illustrating the relative strain amplitude as a function of azimuth angle in degrees around a tubular structure.

FIG. 14 further illustrates the relative strain amplitude, as measured by a wavelength response in the FBG sensor or other transducer, as a function of azimuth around a tubular structure subjected to a crushing force. The maximum compressive strain (negative signal) occurs at 0 (or 360) and 180 degrees. The maximum tensile strain (positive signal) occurs at 90 and 270 degrees. The neutral stain occurs at 45, 135, 225, and 315 degrees.

EXAMPLE 6

Figure 15:
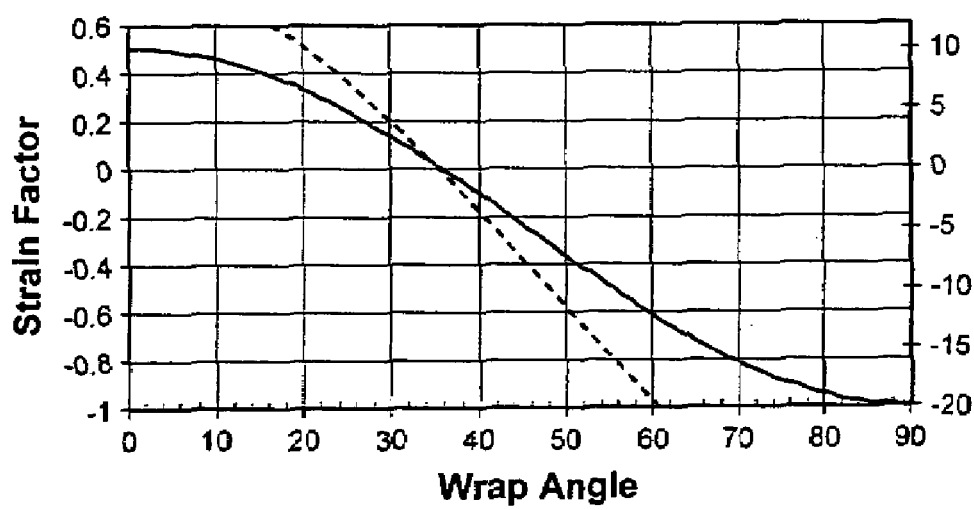
FIG. 15 is a graph illustrating the strain factor versus wrap angle for a structural material undergoing plastic deformation.

In this example, the sensitivity is decreased to allow for measurements of higher axial strains ($\epsilon \cong 2$ percent) on a tubular structure. As the structural material begins to undergo plastic deformation, the Poisson ratio ($\nu$) will tend towards 0.5 in the limit of plastic deformation. Therefore, according to FIG. 15, a wrap angle of approximately 30 degrees or greater is preferred. For example, a wrap angle of 30 degrees will yield a strain factor of 0.15, which translates to a strain of 1.5 percent in the fiber for a 10 percent strain on the structure. A wrap angle of 20 degrees would yield a strain factor of 0.33, which would translate to a strain of 3.3 percent and would break or damage the fiber. The preferred wrap angle could be slightly higher (about 35 degrees) to more nearly null out the applied strain on the fiber (m=0) when very high axial strains on the tubular structure (on the order of 10 percent) are expected and when the intent is to measure buckling rather than axial strain.

Figure 16:
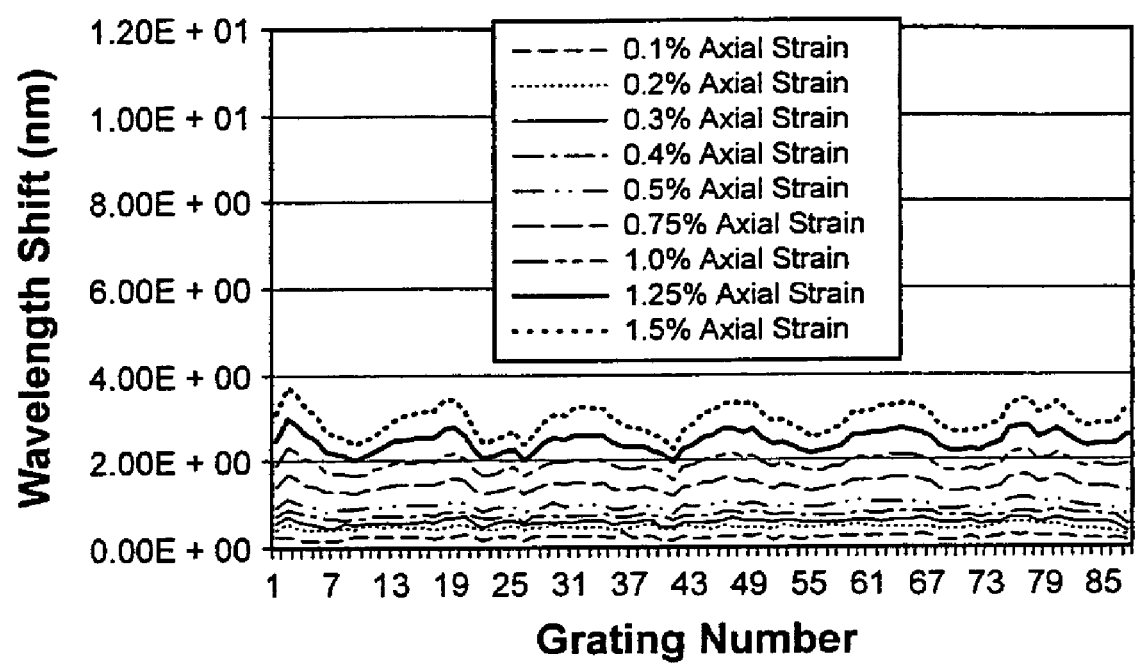
FIG. 16 is a graph illustrating the wavelength shift plotted versus grating number for various levels of applied axial strain.

FIG. 16, below, illustrates the wavelength shift as a function of various levels of pure applied axial strain (compression) on the same tubular structure. The signal at a 30-degree wrap angle is reduced from that of a 20-degree wrap angle, as described in reference to FIG. 15, above. The reduction in signal as a function of wrap angle thus, follows the form shown in FIG. 15 and the strain factor (m) equation described above.

A 30-degree wrap angle should easily accommodate and measure up to five percent axial strain while imparting only a fraction of that strain to the fiber. As the axial strain increases, the onset of buckling and other higher modes of deformation are revealed by the periodic nature of the wavelength response.

Figure 17:
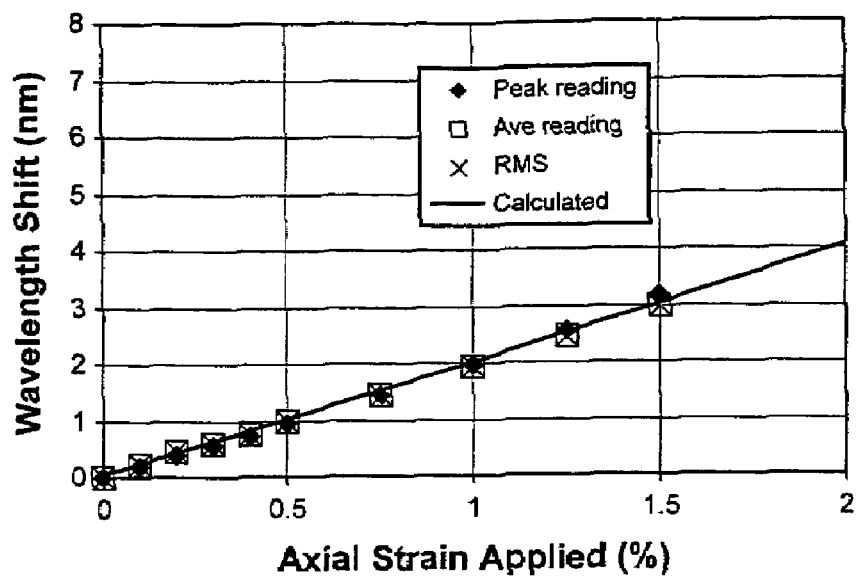
FIG. 17 is a graph comparing the average, peak and root-mean-square (rms) wavelength response with calculated or expected wavelength response, plotted as wavelength shift versus the axial strain applied.

Even though FIG. 16 reveals the onset of tubular buckling, the overall wavelength response remains substantially linear as axial strain increases. This concept is further illustrated in FIG. 17, which compares the average, the peak and the root-mean-square (rms) wavelength response with the calculated or expected wavelength response at various levels of applied axial strain. At about 1.5 percent axial strain, the peak reading begins to diverge slightly from a linear response as the structural material begins to slightly buckle.

One of the most sensitive areas in a well to compaction and deformation is the completion zone. This is particularly true in highly compacting unconsolidated formations in which sand control is required.

In order to control formation areas comprising sand, the base pipe is usually fitted with a filter, commonly referred to as a sand screen. A gravel pack (carefully sized sand) may also be used between the sand screen and the outer casing or formation. The sand screen may comprise a conventional sand screen wire wrap and multiple other conventional screen components (hereinafter referred to as a screen assembly). The wire wrap in the screen assembly is designed to allow fluid to flow through openings that are small enough to exclude large particles.

High axial strain imposed on the base pipe can close the wire wrap openings and impair fluid flow. Bends or buckles in the base pipe may also compromise the structural integrity of the screen assembly, thereby causing a loss of sand control. In this event, the well must be shut in until repairs can be made. Such failures require, at a minimum, a work over of the well and in extreme cases, a complete redrill. Consequently, monitoring the structure for bends, buckles and axial strain in the completion zone is preferred-particularly where sand control is required. Accordingly, the transducers may be applied to the base pipe and/or screen assembly at about a 20-degree wrap angle.

EXAMPLE 7

Figure 18:
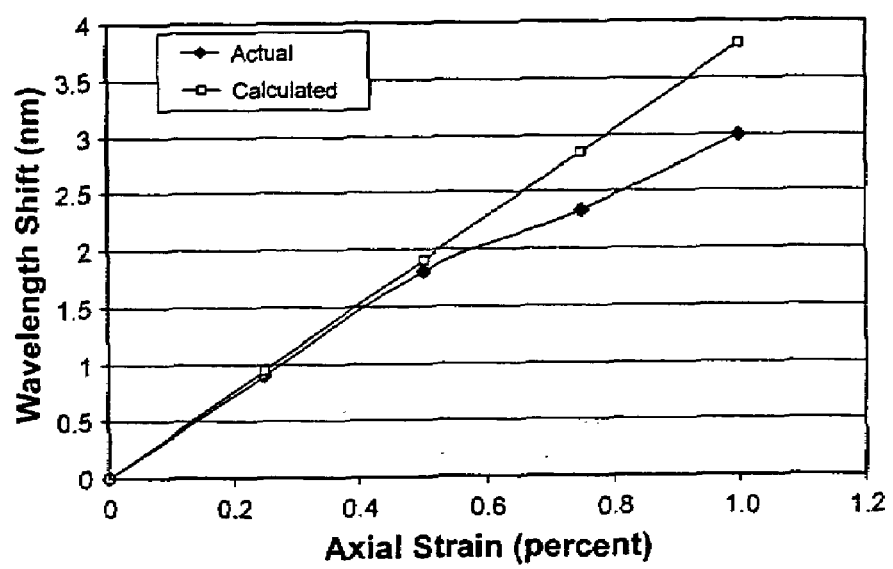
FIG. 18 is a graph illustrating the average wavelength response over the applied transducers at each level of applied axial strain, compared to the calculated wavelength response.

In this example, a 36-inch tubular structure having about a 3-inch diameter and a Poisson ratio (v) of about 0.5, was tested in a controlled environment using a 21-degree wrap angle for the application of the transducers and fiber. Various amounts of axial strain were applied at each end of the structure, which was otherwise unsupported. The average wavelength response (actual) over the applied transducers at each level of applied axial strain is compared to the calculated wavelength response in FIG. 18. At about 0.05 percent strain, there is a departure from the linear calculated wavelength response suggesting a bend or a buckle is beginning to form in the structure tested.

Figure 19:
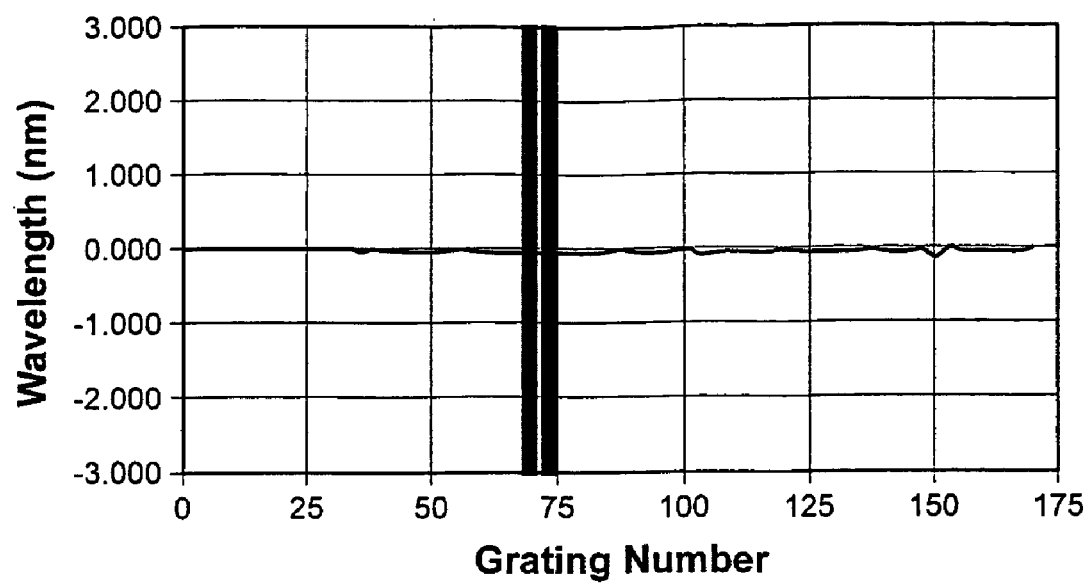
FIG. 19 is a graph of wavelength versus grating number, illustrating an axial strength about zero.

The following Figures (FIGS. 19, 20 and 21) progressively illustrate why a departure from the calculated wavelength response occurs and how it can be used with a periodic signal to detect and determine the magnitude of the bend or buckle in the same structure tested. For convenience, a vertical representation of the tubular structure, as it reacts to the applied axial strain, is illustrated (in black) in the middle of FIGS. 19, 20 and 21. In FIG. 19, the applied axial strain is nominal or about zero.

Figure 20:
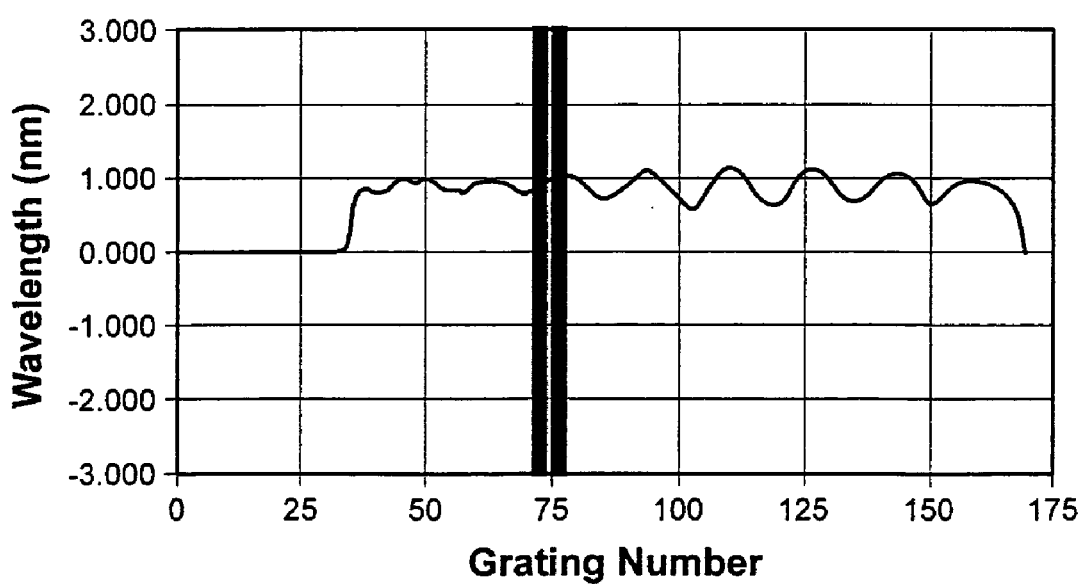
FIG. 20 is a graph of wavelength versus grating number, illustrating an applied axial strain of 0.25 percent.
Figure 21:
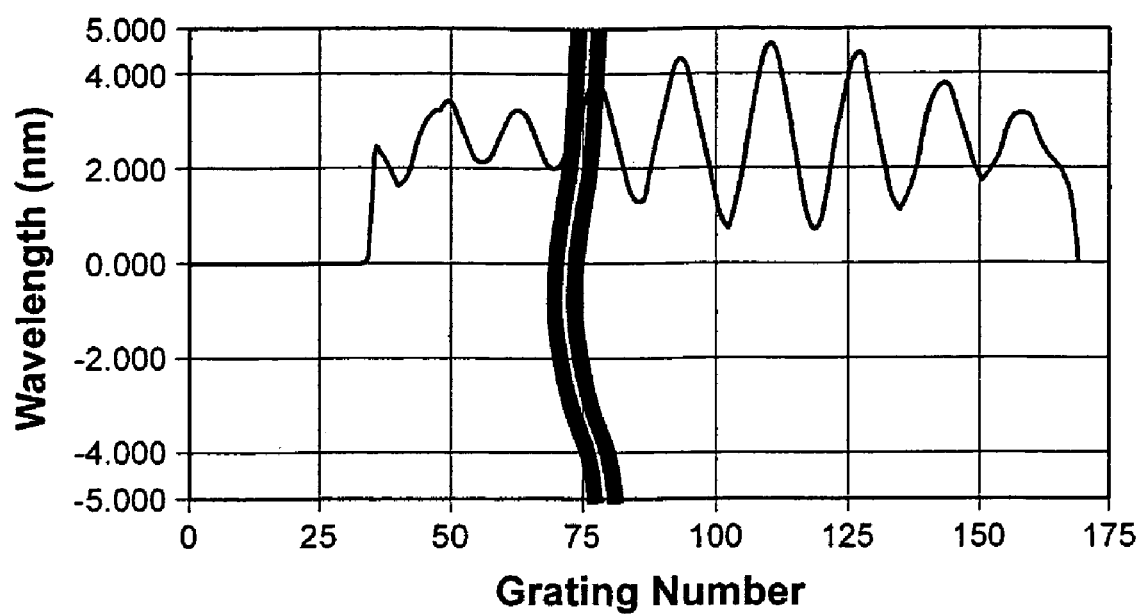
FIG. 21 is a graph of wavelength versus grating number, illustrating an applied axial strain of 0.75 percent.

In FIG. 20, applied axial strain is 0.25 percent. In FIG. 21, the applied axial strain is increased to 0.75 percent. In FIG. 20, the wavelength response illustrates the applied strain, however, there is no apparent deformation in the structure.

In FIG. 21, the wavelength response is noticeably greater than the wavelength response in FIG. 20, and there appears to be a bend or a buckle in the structure. As the axial strain applied to each end of the structure increases, the structure is compressed, which causes deformation in the form of a bend or a buckle.

Figures 22, 22A:
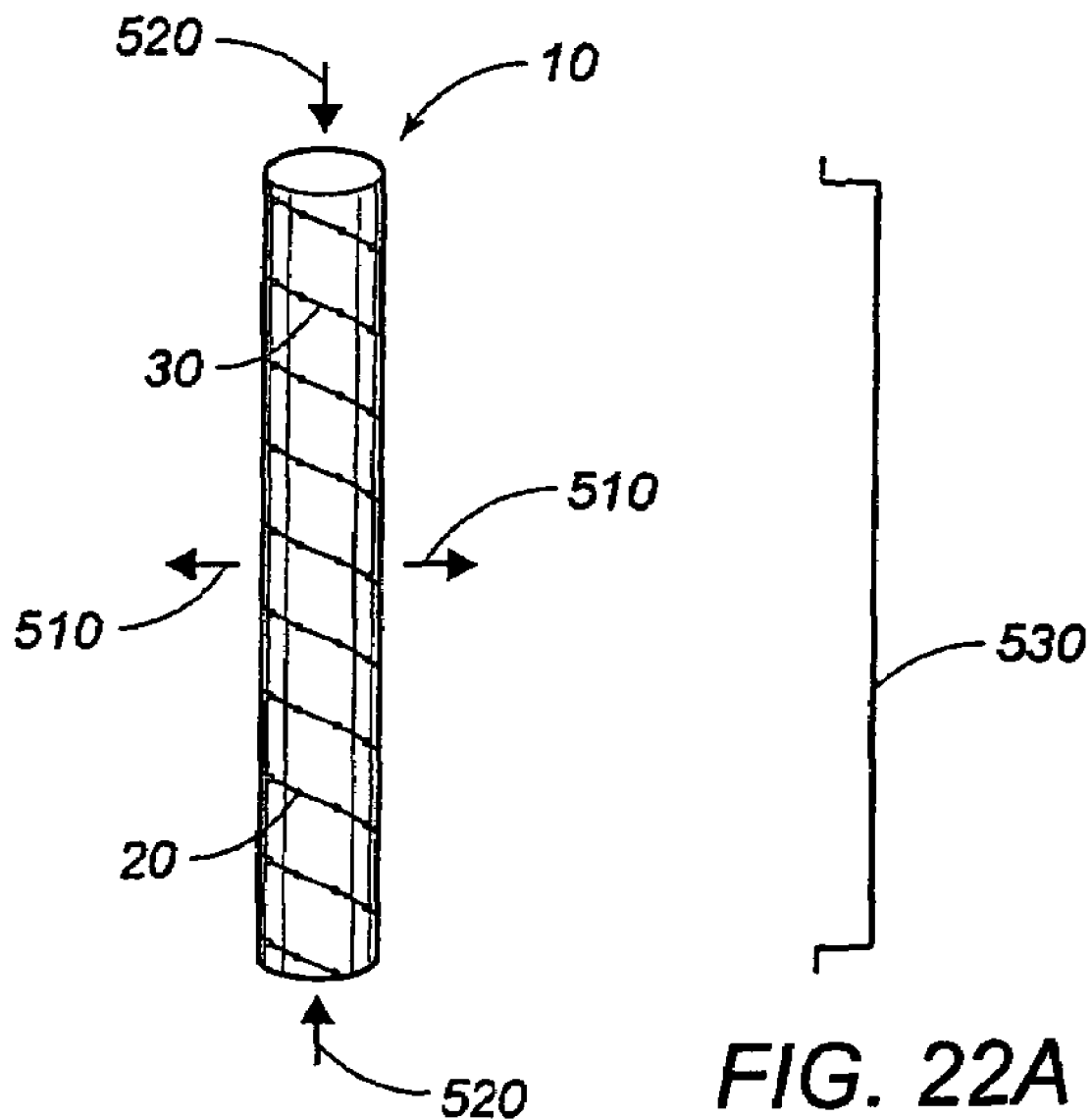
FIG. 22 is an elevational view of a cylindrical structure illustrating compressional forces on the structure.
FIG. 22A is an image of a wavelength response illustrating the corresponding strain measured by the transducers in FIG. 22.

FIG. 22 represents a simple illustration of pure axial strain (force) applied to the structure 10. Here, the structure 10 is subjected to an axial force 520. The wavelength response 530, representing strain on the structure 10 measured by the transducers 20, associated with the axial force 520 is substantially constant as illustrated in FIG. 22A. Thus, the axial force 520 causes the structure 10 to shorten or compress and expand in the direction indicated by the arrows 510. As a result, the wavelength response 530 is substantially constant until the structure 10 begins to deform in the shape of a bend or a buckle as demonstrated by the progressive illustration in FIGS. 19, 20 and 21, above.

Figure 23:
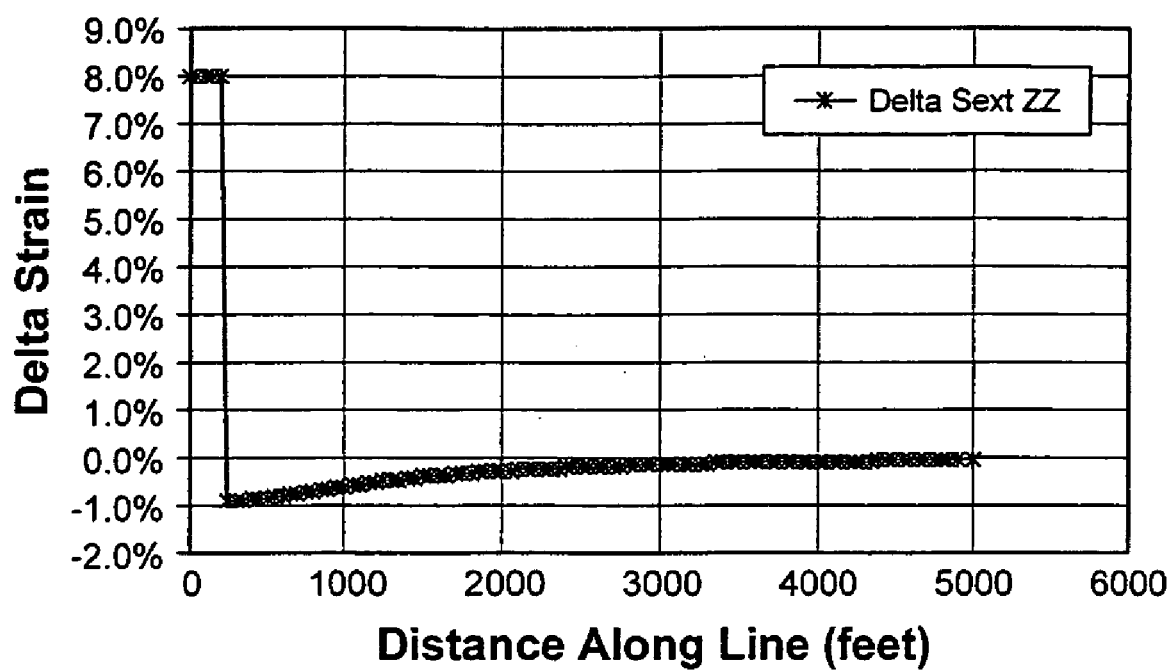
FIG. 23 is a theoretical plot of delta strain versus distance along a line above a reservoir.

One of the areas in the well where the least amount of strain is likely to occur in compacting reservoirs is in the overburden. The highest tensile strains are usually observed very near the compacting zone and the magnitude of the strain reduces as the distance from the compacting zone increases. This is reflected in the theoretical plot in FIG. 23, wherein the reservoir is undergoing 8.0 percent compaction strain and the maximum extensional strain in the overburden is 1.0 percent.

The actual magnitude of the extensional strain in the overburden just above the reservoir is highly dependent upon the reservoir geometry and the material properties of the reservoir and overburden. The ratio of the extensional strain just above the reservoir to the compressional strain in the reservoir can be used as one diagnostic for reservoir performance. Likewise, the amount of a tensional strain in the overburden affects such things as seismic signals used for 4D seismic measurements. Thus, the fiber and transducers are preferably applied at about 90 degrees longitudinally along the structure to increase sensitivity to tensile strains. When the fiber and transducers are positioned on a tubular structure specifically designed for monitoring such strain, a very accurate measurement can be made.

Furthermore, three or more fibers containing transducers may be longitudinally and equidistantly positioned around the tubular structure in order to detect not only axial strain on the structure but also bending strain. The strain on the outside of the radius of curvature of the bend or buckle will be higher (in tension) than the strain on the inside radius. Thus, when 3 or more fibers containing transducers are positioned in this manner, the detection and measurement of a long radius bend is possible through the uneven wavelength response.

The present invention may be utilized to detect and monitor deformation of any substantially cylindrical structure in a well bore caused by structural strain, regardless of the well bore or formation activity. As described herein, the present invention may be uniquely tailored to detect and measure axial compaction, shear, bending, buckling, and crushing (ovalization) induced strain on the well bore structure due to fault movement and/or compaction in the formation. The present invention thus, may be applied to any substantially cylindrical structure in a well bore for purposes of detecting and monitoring deformation of the structure during production or other non-production operations such as, for example, completion (e.g., gravel packing/frac packing), production and stimulation operations.

The present invention could also be used in any other situation where pipes expand and contract, or bend, such as, for example, refineries, gas plants, and pipelines. The present invention may also be useful for imaging deformation (shape/magnitude/movement) of other, non-cylindrical, objects and thus, could be used for displacement sensing using the same principles applied to different length scales. The present invention may also be used to obtain data for other types of geomechanical modeling, including, for example dams or other structures. It is therefore, contemplated that various situations, alterations and/or modifications may be made to the disclosed embodiments without departing from the spirit and scope of the invention as defined by the appended claims and equivalents thereof.

The invention claimed is:

1. A method for imaging deformation of an object comprising the steps of:
   applying a plurality of transducers or sensors to the object at a preferred wrap angle;
   detecting deformation of the object at each transducer or sensor; and
   imaging the deformation detected at each transducer or sensor on a projection device, further comprising the steps of:
   selecting a preferred wrap angle range;
   determining a strain factor for at least one wrap within the preferred wrap angle range; and
   determining the preferred wrap angle within the preferred wrap angle range based on at least one determined strain factor.

2. The method of claim 1, wherein the plurality of transducers or sensors are connected by an optical fiber.

3. The method of claim 1, wherein the object is cylindrical and each transducer or sensor detects axial and radial strain on the object.

4. The method of claim 1, wherein the deformation detected at each transducer or sensor is transmitted through at least one of a fiber optic, wired and wireless medium to the projection device.

5. The method of claim 1, wherein the deformation image is displayed as a wavelength response at each transducer or sensor and a corresponding transducer or sensor number.

6. The method of claim 5, further comprising the steps of:
   monitoring the wavelength response; and
   detecting variations in the wavelength response at each transducer or sensor.

7. The method of claim 6, wherein the variations in the wavelength response are detected by variations in an amplitude for the wavelength response at each transducer or sensor.

8. The method of claim 5, wherein various types of deformation may be detected based upon the wavelength response.

9. The method of claim 1, wherein detecting the deformation comprises detecting the deformation in the direction of the preferred wrap angle.

10. The method of claim 1, wherein at least two of the plurality of transducers or sensors are provided in a selected wrap around the object.

11. The method of claim 1, wherein at least ten of the plurality of transducers or sensors are provided in a selected wrap around the object.

12. The method of claim 1, wherein the object is an oilfield tubular structure.

13. The method of claim 1, wherein the object is one of a drillpipe or a casing.

14. The method of claim 1, wherein the object is a cylindrical structure in a well bore.

15. A method of determining a preferred application of a plurality of transducers or sensors to a cylindrical structure for monitoring deformation of the structure comprising:
   selecting a preferred wrap angle range;
   determining a strain factor for at least one wrap angle within the preferred wrap angle range;
   determining a preferred wrap angle within the preferred wrap angle range based on at least one determined strain factor; and
   determining the preferred application of the plurality of transducers or sensors to the structure based on the preferred wrap angle.

16. The method of claim 15, further comprising the step of applying the plurality of transducers or sensors to the structure along a preferred application line.

17. The method of claim 16, wherein the preferred wrap angle is formed between the preferred application line and one of a first imaginary reference line extending longitudinally along a surface of the structure and a second imaginary reference line circumscribing the structure.

18. The method of claim 15, wherein the step of determining the strain factor is based on a predetermined Poisson ratio for the structure and a predetermined strain for the structure.

19. The method of claim 18, wherein the predetermined Poisson ratio for the structure is based upon the predetermined strain for the structure.

20. The method of claim 18, wherein the predetermined Poisson ratio is between about 0.3 and about 0.5.

21. The method of claim 18, wherein the predetermined strain for the structure is based upon a maximum strain the structure may encounter.

22. The method of claim 15, further comprising the steps of:
   determining the strain factor for each wrap angle within the preferred wrap angle range; and determining the preferred wrap angle within the preferred wrap angle range based on at least one of the determined strain factors.

23. The method of claim 22, wherein the step of determining the preferred wrap angle within the preferred wrap angle range is based on a preferred strain factor range comprising a plurality of the determined strain factors.

24. The method of claim 23, wherein the step of determining the preferred wrap angle within the preferred wrap angle range is based on at least one of the plurality of determined strain factors within the strain factor range.

25. The method of claim 22, further comprising the step of selecting at least one of the determined strain factors based on a maximum transducer or sensor strain.

26. The method of claim 23, further comprising the step of selecting the strain factor range based on a maximum transducer or sensor strain.

27. The method of claim 15, further comprising the steps of:
determining the strain factor for a plurality of wrap angles within the preferred wrap angle range;
determining another preferred wrap angle within the preferred wrap angle range based on at least one of the determined strain factors; and
determining the preferred application of the plurality of transducers or sensors to the structure based on the preferred wrap angle and another preferred wrap angle.

28. The method of claim 27, further comprising the steps of:
selecting the at least one determined strain factor based on a predetermined force to be applied to an area of the structure; and
selecting at least another one of the determined strain factors based on another predetermined force to be applied to at least one of the area of the structure and another area of the structure.

29. The method of claim 28, further comprising the step of applying the plurality of transducers or sensors to at least one of the area of the structure and another area of the structure based on at least one of the preferred wrap angle and another preferred wrap angle.

30. The method of claim 15, wherein the plurality of transducers or sensors are applied to one of an interior surface and an exterior surface of the structure.

31. The method of claim 15, wherein the plurality of transducers or sensors are applied to the structure in at least one of a protective sheath and a protective sheet.

32. The method of claim 15, wherein the plurality of transducers or sensors are applied to one of a channel within the structure and integrally within the structure when it is formed.

33. The method of claim 15, further comprising the steps of:
introducing at least one of the plurality of transducers or sensors into an opening in a conduit;
positioning at least one of the plurality of transducers or sensors within the conduit; and
introducing a fluid into the opening in the conduit to at least partially solidify and secure at least one of the plurality of transducers or sensors within the conduit.

34. The method of claim 33, wherein the conduit is positioned within the structure along a preferred application line and the preferred wrap angle is formed between the preferred application line and one of a first imaginary reference line extending longitudinally along a surface of the structure and a second imaginary reference line circumferencing the structure.

35. The method of claim 33, wherein the conduit is positioned on the structure along a preferred application line and the preferred wrap angle is formed between the preferred application line and one of a first imaginary reference line extending longitudinally along a surface of the structure and a second imaginary reference line circumferencing the structure.

36. The method of claim 33, wherein at least one of the plurality of transducers or sensors is positioned within the conduit by at least one of a compressional force and tensional force.

37. The method of claim 36, wherein each of the plurality of transducers or sensors is independently powered.

38. The method of claim 15, wherein each of the plurality of transducers or sensors is coupled to another one of the plurality of transducers or sensors through a transmission medium capable of transmitting a signal.

39. The method of claim 15, wherein each of the plurality of transducers or sensors is wirelessly coupled to another one of the plurality of transducers or sensors.

40. The method of claim 15, wherein at least two of the plurality of transducers or sensors are provided in a selected wrap around the cylindrical structure.

41. The method of claim 15, wherein at least ten of the plurality of transducers or sensors are provided in a selected wrap around the cylindrical structure.

42. A method of determining a preferred application of an optical fiber to a cylindrical structure, wherein the optical fiber includes at least one sensor, comprising:
selecting a preferred wrap angle range for the optical fiber;
determining a fiber strain factor for at least one wrap angle within the preferred wrap angle range;
determining a preferred wrap angle for the optical fiber within the preferred wrap angle range based on at least one determined fiber strain factor; and
determining the preferred application of the optical fiber to the structure based on the preferred wrap angle, wherein the step of determining the fiber strain factor is based on a predetermined Poisson ratio for the structure and an amount of predetermined strain for the structure.

43. The method of claim 42, wherein at least one sensor detects deformation of the structure.

44. The method of claim 42, further comprising the step of applying the optical fiber to the structure along a preferred application line.

45. The method of claim 44, wherein the preferred wrap angle is formed between the preferred application line and one of a first imaginary reference line extending longitudinally along a surface of the structure and second imaginary reference line circumscribing the structure.

46. The method of claim 42, wherein the predetermined Poisson ratio for the structure is based upon the predetermined strain for the structure.

47. The method of claim 42, wherein the predetermined Poisson ratio is between about 0.3 and about 0.5.

48. The method of claim 42, wherein the predetermined strain for the structure is based upon a maximum strain the structure may encounter.

49. The method of claim 42, further comprising the step of determining a preferred number of wraps based on a predetermined axial length of the structure, a diameter for the structure and the preferred wrap angle.

50. The method of claim 49, wherein the preferred number of wraps is at least eight.

51. The method of claim 49, further comprising the step of determining the preferred application of the optical fiber to the structure based on the preferred number of wraps.

52. The method of claim 33, further comprising the step of determining a preferred sensor spacing based on a preferred number of sensors and a predetermined length of fiber.

53. The method of claim 52, wherein the preferred number of sensors is at least ten.

54. The method of claim 52, further comprising the step of determining the preferred application of the optical fiber to the structure based on the preferred number of sensors.

55. The method of claim 33, wherein the preferred wrap angle range is between about 0° and about 90°.

56. The method of claim 33, further comprising the steps of:
determining the fiber strain for each wrap angle within the preferred wrap angle range; and
determining the preferred wrap angle for the optical fiber within the preferred wrap angle range based on at least one of the determined fiber strain factors.

57. The method of claim 56, wherein the step of determining the preferred wrap angle of the optical fiber within the preferred wrap angle range is based on a preferred fiber strain factor range comprising a plurality of the determined fiber strain factors.

58. The method of claim 57, wherein the step of determining the preferred wrap angle for the optical fiber within the preferred wrap angle range is based on at least one of the plurality of determined fiber strain factors within the fiber strain factor range.

59. The method of claim 56, further comprising the step of selecting at least one of the determined fiber strain factors based on a maximum fiber strain.

60. The method of claim 57, further comprising the step of selecting the fiber strain factor range based on a maximum fiber strain.

61. The method of claim 42, further comprising the steps of:
determining the fiber strain factor for a plurality of wrap angles within the preferred wrap angle range;
determining another preferred wrap angle for the optical fiber within the preferred wrap angle range based on at least another one of the determined fiber strain factors; and
determining the preferred application of the optical fiber to the structure based on the preferred wrap angle and another preferred wrap angle.

62. The method of claim 61, further comprising the steps of:
selecting at least one determined fiber strain factor based on a predetermined force to be applied to an area of the structure; and
selecting at least another one of the determined fiber strain factors based on another predetermined force to be applied to at least one of the area of the structure and another area of the structure.

63. The method of claim 62, further comprising the step of applying the optical fiber to at least one of the area of the structure and another area of the structure based on at least one of the preferred wrap angles and another preferred wrap angle.

64. The method of claim 42, wherein the optical fiber is applied to one of an interior surface and an exterior surface of the structure.

65. The method of claim 42, wherein the optical fiber is applied to the structure in at least one of a protective sheath and a protective sheet.

66. The method of claim 42, wherein the optical fiber is applied to one of a channel within the structure and integrally within the structure when it is formed.

67. The method of claim 42, further comprising the steps of:
introducing at least one of a plurality of sensors into an opening in a conduit;
positioning at least one of the plurality of sensors within the conduit; and
introducing a fluid into the opening in the conduit to at least partially solidify and secure at least one of the plurality of sensors within the conduit.

68. The method of claim 67, wherein the conduit is positioned within the structure along a preferred application line and the preferred wrap angle is formed between the preferred application line and one of a first imaginary reference line extending longitudinally along a surface of the structure and a second imaginary reference line circumferencing the structure.

69. The method of claim 67, wherein the conduit is positioned on the structure along a preferred application line and the preferred wrap angle is formed between the preferred application line and one of a first imaginary reference line extending longitudinally along a surface of the structure and a second imaginary reference line circumferencing the structure.

70. The method of claim 67, wherein at least one of the plurality of sensors is positioned within the conduit by at least one of a compressional force and tensional force.

71. The method of claim 42, wherein the structure comprises a screen assembly.

72. The method of claim 71, wherein the screen assembly comprises multiple screen components.

73. The method of claim 72, wherein a plurality of sensors are applied to at least one of an interior surface and an exterior surface of one of the multiple screen components.

74. The method of claim 73, wherein the plurality of sensors are applied to the exterior surface of one of the multiple screen components and the interior surface of another one of the multiple screen components.

75. The method of claim 72, wherein the plurality of sensors are applied to one of the multiple screen components in at least one of a protective sheath and a protective sheet.

76. The method of claim 72, wherein the plurality of sensors are applied to a channel within one of the multiple screen components.

77. The method of claim 72, further comprising the steps of:
introducing at least one of the plurality of sensors into an opening in a conduit;
positioning at least one of the plurality of sensors within the conduit; and
introducing a fluid into the opening in the conduit to at least partially solidify and secure at least one of the plurality of sensors within the conduit.

78. The method of claim 77, wherein the conduit is positioned within one of the multiple screen components along a preferred application line and the preferred wrap angle is formed between the preferred application line and one of a first imaginary reference line extending longitudinally along a surface of the structure and a second imaginary reference line circumscribing the structure.

79. The method of claim 77, wherein the conduit is positioned on one of the multiple screen components along a preferred application line and the preferred wrap angle is formed between the preferred application line and one of a first imaginary reference line extending longitudinally along a surface of the structure and a second imaginary reference line circumscribing the structure.

80. The method of claim 42, wherein the fiber comprises at least two of the plurality of sensors in a selected wrap around the cylindrical structure.

81. The method of claim 42, wherein the fiber comprises at least ten of the plurality of sensors in a selected wrap around the cylindrical structure.

82. A method of determining a preferred application of an optical fiber to a cylindrical structure, wherein the optical fiber includes at least one sensor, comprising:
selecting a preferred wrap angle range for the optical fiber;
determining a fiber strain factor for at least one wrap angle within the preferred wrap angle range;
determining a preferred wrap angle for the optical fiber within the preferred wrap angle range based on at least one determined fiber strain factor; and
determining the preferred application of the optical fiber to the structure based on the preferred wrap angle, wherein the optical fiber is applied to the structure in at least one of a protective sheath and a protective sheet.

83. A method of determining a preferred application of an optical fiber to a cylindrical structure, wherein the optical fiber includes at least one sensor, comprising:
selecting a preferred wrap angle range for the optical fiber;
determining a fiber strain factor for at least one wrap angle within the preferred wrap angle range;
determining a preferred wrap angle for the optical fiber within the preferred wrap angle range based on at least one determined fiber strain factor; and
determining the preferred application of the optical fiber to the structure based on the preferred wrap angle, further comprising the steps of:
introducing at least one of a plurality of sensors into an opening in a conduit;
positioning at least one of the plurality of sensors within the conduit; and
introducing a fluid into the opening in the conduit to at least partially solidify and secure at least one of the plurality of sensors within the conduit.

84. The method of claim 83, wherein the conduit is positioned within the structure along a preferred application line and the preferred wrap angle is formed between the preferred application line and one of a first imaginary reference line extending longitudinally along a surface of the structure and a second imaginary reference line circumferencing the structure.

85. The method of claim 83, wherein the conduit is positioned on the structure along a preferred application line and the preferred wrap angle is formed between the preferred application line and one of a first imaginary reference line extending longitudinally along a surface of the structure and a second imaginary reference line circumferencing the structure.

86. The method of claim 83, wherein at least one of the plurality of sensors is positioned within the conduit by at least one of a compressional force and tensional force.

87. A method of determining a preferred application of an optical fiber to a cylindrical structure, wherein the optical fiber includes at least one sensor, comprising:
selecting a preferred wrap angle range for the optical fiber;
determining a fiber strain factor for at least one wrap angle within the preferred wrap angle range;
determining a preferred wrap angle for the optical fiber within the preferred wrap angle range based on at least one determined fiber strain factor; and
determining the preferred application of the optical fiber to the structure based on the preferred wrap angle, further comprising the step of determining a preferred number of wraps based on a predetermined axial length of the structure, a diameter for the structure and the preferred wrap angle.

88. The method of claim 87, wherein the preferred number of wraps is at least eight.

89. The method of claim 87, further comprising the step of determining the preferred application of the optical fiber to the structure based on the preferred number of wraps.

90. A method of determining a preferred application of an optical fiber to a cylindrical structure, wherein the optical fiber includes at least one sensor, comprising:
selecting a preferred wrap angle range for the optical fiber;
determining a fiber strain factor for at least one wrap angle within the preferred wrap angle range;
determining a preferred wrap angle for the optical fiber within the preferred wrap angle range based on at least one determined fiber strain factor; and
determining the preferred application of the optical fiber to the structure based on the preferred wrap angle, further comprising the step of determining a preferred sensor spacing based on a preferred number of sensors and a predetermined length of fiber.

91. The method of claim 90, wherein the preferred number of sensors is at least ten.

92. The method of claim 90, further comprising the step of determining the preferred application of the optical fiber to the structure based on the preferred number of sensors.

93. A method of determining a preferred application of an optical fiber to a cylindrical structure, wherein the optical fiber includes at least one sensor, comprising:
selecting a preferred wrap angle range for the optical fiber;
determining a fiber strain factor for at least one wrap angle within the preferred wrap angle range;
determining a preferred wrap angle for the optical fiber within the preferred wrap angle range based on at least one determined fiber strain factor; and
determining the preferred application of the optical fiber to the structure based on the preferred wrap angle, wherein the structure comprises a screen assembly.

94. The method of claim 93, wherein the screen assembly comprises multiple screen components.

95. The method of claim 94, wherein a plurality of sensors are applied to at least one of an interior surface and an exterior surface of one of the multiple screen components.

96. The method of claim 95, wherein the plurality of sensors are applied to the exterior surface of one of the multiple screen components and the interior surface of another one of the multiple screen components.

97. The method of claim 94, wherein the plurality of sensors are applied to one of the multiple screen components in at least one of a protective sheath and a protective sheet.

98. The method of claim 94, wherein the plurality of sensors are applied to a channel within one of the multiple screen components.

99. The method of claim 94, further comprising the steps of:
   introducing at least one of the plurality of sensors into an opening in a conduit;
   positioning at least one of the plurality of sensors within the conduit; and
   introducing a fluid into the opening in the conduit to at least partially solidify and secure at least one of the plurality of sensors within the conduit.

100. The method of claim 99, wherein the conduit is positioned within one of the multiple screen components along a preferred application line and the preferred wrap angle is formed between the preferred application line and one of a first imaginary reference line extending longitudinally along a surface of the structure and a second imaginary reference line circumscribing the structure.

101. The method of claim 99, wherein the conduit is positioned on one of the multiple screen components along a preferred application line and the preferred wrap angle is formed between the preferred application line and one of a first imaginary reference line extending longitudinally along a surface of the structure and a second imaginary reference line circumscribing the structure.

102. A method for imaging deformation of an object comprising the steps of:
   applying a plurality of transducers or sensors to the object at a preferred wrap angle;
   detecting deformation of the object at each transducer or sensor; and
   imaging the deformation detected at each transducer or sensor on a projection device, wherein detecting the deformation comprises detecting the deformation in the direction of the preferred wrap angle.

103. A method for imaging deformation of an object comprising the steps of:
   applying a plurality of transducers or sensors to the object at a preferred wrap angle;
   detecting deformation of the object at each transducer or sensor; and
   imaging the deformation detected at each transducer or sensor on a projection device, wherein at least two of the plurality of transducers or sensors are provided in a selected wrap around the object.

104. The method of claim 103, wherein at least ten of the plurality of transducers or sensors are provided in a selected wrap around the object.

* * * * *